(12) United States Patent
Aono et al.

(10) Patent No.: US 7,594,041 B2
(45) Date of Patent: Sep. 22, 2009

(54) RECORDING MEDIUM, CONTENT RECORDING/REPRODUCING SYSTEM, CONTENT REPRODUCING APPARATUS, CONTENT RECORDING APPARATUS, AND CONTENT RECODING APPARATUS

(75) Inventors: Tomoko Aono, Chiba (JP); Kazuto Ohhara, Funabashi (JP); Toshio Nomura, Hachioji (JP); Motohiro Ito, Chiba (JP); Hiroyuki Katata, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

(21) Appl. No.: 10/495,101

(22) PCT Filed: Nov. 15, 2002

(86) PCT No.: PCT/JP02/11952

§ 371 (c)(1),
(2), (4) Date: Oct. 7, 2004

(87) PCT Pub. No.: WO03/042915

PCT Pub. Date: May 22, 2003

(65) Prior Publication Data

US 2005/0036373 A1     Feb. 17, 2005

(30) Foreign Application Priority Data

| Nov. 16, 2001 | (JP) | ............ 2001-350956 |
| Jun. 17, 2002 | (JP) | ............ 2002-175779 |
| Sep. 24, 2002 | (JP) | ............ 2002-278177 |

(51) Int. Cl.
    *G06F 3/00*    (2006.01)
    *G06F 13/12*    (2006.01)
    *G06F 1/24*    (2006.01)
    *H04N 5/76*    (2006.01)

(52) U.S. Cl. ............... 710/13; 710/8; 710/14; 710/62; 713/100; 348/231.3; 348/231.8

(58) Field of Classification Search ............ 710/13–14, 710/36, 8, 62; 348/231.2, 231.3, 231.8, 231.9; 713/100
See application file for complete search history.

(56) References Cited

U.S. PATENT DOCUMENTS

| 5,138,459 A | * | 8/1992 | Roberts et al. ............ 348/231.6 |
| 5,173,783 A | * | 12/1992 | Oku et al. .................... 358/302 |

(Continued)

FOREIGN PATENT DOCUMENTS

EP     0821359    *   1/1998

(Continued)

*Primary Examiner*—Alan Chen
*Assistant Examiner*—Jonathan R Plante
(74) *Attorney, Agent, or Firm*—Nixon & Vanderhye P.C.

(57) ABSTRACT

A removable recording medium having an area for storing a content and, when attached to a reproducing apparatus, allowing the content recorded in the area to be reproduced is arranged so as to include, separately from the area for storing the content, an area for storing one or more conditions that allow the content to be reproduced by the reproducing apparatus. With this arrangement, by pre-recording on the recording medium, information for allowing the reproducing apparatus to reproduce a content, the recording apparatus can automatically perform processing such as encoding to a content in accordance with the information recorded on the recording medium and then record the content on the recording medium; and the reproducing apparatus can unconditionally reproduce a content recorded on the recording medium.

16 Claims, 16 Drawing Sheets

U.S. PATENT DOCUMENTS

| | | | |
|---|---|---|---|
| 5,640,198 A * | 6/1997 | Makiyama et al. | 348/14.12 |
| 5,806,072 A | 9/1998 | Kuba et al. | |
| 5,987,181 A * | 11/1999 | Makiyama et al. | 382/239 |
| 6,006,039 A * | 12/1999 | Steinberg et al. | 396/57 |
| 6,034,832 A | 3/2000 | Ichimura et al. | |
| 6,040,920 A | 3/2000 | Ichiriki | |
| 6,574,588 B1 * | 6/2003 | Shapiro et al. | 703/24 |
| 6,650,435 B1 * | 11/2003 | Ikeda | 358/1.9 |
| 6,690,881 B1 * | 2/2004 | Tomita et al. | 386/117 |
| 6,833,865 B1 * | 12/2004 | Fuller et al. | 348/231.2 |
| 6,937,356 B1 * | 8/2005 | Ito et al. | 358/1.16 |
| 7,321,784 B2 * | 1/2008 | Serceki et al. | 455/557 |
| 2001/0011219 A1 * | 8/2001 | Okano | 704/500 |
| 2001/0021965 A1 * | 9/2001 | Yokota et al. | 711/163 |
| 2002/0029343 A1 * | 3/2002 | Kurita | 713/185 |
| 2002/0103994 A1 * | 8/2002 | Morrison et al. | 713/1 |
| 2003/0078072 A1 * | 4/2003 | Serceki et al. | 455/557 |
| 2003/0110371 A1 * | 6/2003 | Yang et al. | 713/100 |

FOREIGN PATENT DOCUMENTS

| | | |
|---|---|---|
| EP | 0 874 519 A2 | 10/1998 |
| GB | 2 328 104 A | 2/1999 |
| JP | 2-93820 A | 4/1990 |
| JP | 9-259574 A | 10/1997 |
| JP | 10-003745 | 1/1998 |
| JP | 10-3745 A | 1/1998 |
| JP | 2000-341629 A | 12/2000 |
| JP | 3152903 B2 | 1/2001 |
| JP | 2001-75598 A | 3/2001 |
| JP | 2001-119302 A | 4/2001 |
| JP | 2001-326892 | 11/2001 |
| WO | 98/18258 A1 | 4/1998 |
| WO | 01/60051 A1 | 8/2001 |

* cited by examiner

FIG. 3

```
CAPABILITY TABLE    {
      CONTENT    2    STILL IMAGE, SOUND
      STILL IMAGE    {
        ENCODING SYSTEM    JPEG(Exif)    {
              SIZE    8    SUXGA、UXGA、SXGA、XGA、SVGA、VGA、QVGA、QQGVA
              PIXEL SAMPLING    2    4:2:2、4:2:0
        }
        ENCODING SYSTEM    BMP    {
              SIZE    8    SUXGA、UXGA、SXGA、XGA、SVGA、VGA、QVGA、QQGVA
              PIXEL SAMPLING    1    4:4:4
        }
      }
      SOUND    {
          ENCODING SYSTEM    G.726    {
            SAMPLING FREQUENCY    1    8000
            BIT RATE    3    32000、24000、16000
          }
      }
}
```

US 7,594,041 B2

RECORDING MEDIUM, CONTENT RECORDING/REPRODUCING SYSTEM, CONTENT REPRODUCING APPARATUS, CONTENT RECORDING APPARATUS, AND CONTENT RECODING APPARATUS

This application is the US national phase of international application PCT/JP02/11952 filed in Japanese on 15 Nov. 2002, which designated the US. PCT/JP02/11952 claims priority to JP Application No. 2001-350956 filed 16 Nov. 2001, JP Application No. 2002-175779 filed 17 Jun. 2002 and JP Application No. 2002-278177 filed 24 Sep. 2002. The entire contents of these applications are incorporated herein by reference.

TECHNICAL FIELD

The technology presented herein relates to a removable recording medium, a content recording/reproducing system for recording and reproducing a content on and from the recording medium, a content reproducing apparatus, a content recording apparatus, and a content re-coding apparatus. The technology particularly relates to a technique for recording a content so as to be reproduced by different types of content reproducing apparatuses.

BACKGROUND ART

In these years, a high-capacity and compact removable recording medium has come to be widely used. An example of such a recording medium is an IC memory card (hereinafter referred to as memory card) that can be randomly accessed, such as a flash memory. Further, also have been developed are recording apparatuses and reproducing apparatuses for recording and reproducing various types of content on and from the memory card.

In accordance with this, many types of memory cards have been developed. For example, there are now many types of flash memories such as CompactFlush (registered trademark) (CF), Smart Media (registered trademark) (SM), memory stick, MultimediaCard (MMC), and SecureDigital (SD). Some types of the memory cards comply with a technique for protecting copyrights, thus facilitating the circulation of digital content.

Such a memory card can be used by being attached to a plurality of different content recording apparatuses or content reproducing apparatuses. For example, a SD memory card can allow a content to be recorded on and reproduced from the SD memory card when inserted into various types of content reproducing apparatuses respectively having built-in SD card slots. These content reproducing apparatuses include a PC (personal computer), a digital video camera (DVC), a printer, a digital camera, an audio player, an IC recorder, a car audio system, a car navigation system, a portable terminal (such as an e-mail terminal, a portable phone, and a PHS), and a facsimile machine.

A typical conventional recording medium is arranged so that data is recorded on the recording medium by a recording apparatus and reproduced from the memory card by a reproducing apparatus that is a companion to the recording apparatus. Namely, a reproducing apparatus must be arranged so as to reproduce data recorded by a companion recording apparatus. For example, data recorded on a video tape by a video cassette recorder can be reproduced by any video cassette recorder.

However, since some devices such as digital camera now employ different encoding systems according to types of the device, there are some cases where a content cannot be reproduced by a digital camera whose type is different from that of a digital camera that recorded the content.

In order to solve the foregoing problems, Japanese Unexamined Patent Publication No. 2000-341629 (Tokukai 2000-341629; published on Dec. 8, 2000), for example, suggests a certain technique. In this technique, in a case where data taken by a digital camera (DA) is recorded on a recording medium (A) and then copied to a recording medium (B) using a digital camera (DB) whose type is different from that of the digital camera (DA), only data that is reproducible by the digital camera (DB) is selected from the data recorded on the recording medium (A) and copied to the recording medium (B).

Namely, in the technique described in Tokukai 2000-341629, unique information of the manufacturer is recorded in an area of header and manufacturer information of the image data that is taken by the digital camera (DA), as shown in FIG. 20(a). The digital camera (DB) reads out the unique information from the recording medium (A) so as to judge whether or not the image data can be reproduced by the digital camera (DB). Then, only image data that can be reproduced by the digital camera (DB) is automatically selected from the image data and copied to the recording medium (B).

Further, Japanese Patent No. 3152903 (published on Dec. 4, 1998) suggests a technique used in a digital camera complying with a plurality of decoding systems. In this technique, control information (such as encoding system and shooting condition) with respect to each image in the image data that is recorded on a recording medium is read so that a decoding system corresponding to encoded data of the images recorded on the recording medium is selected before the image data is reproduced.

In other words, the arrangement described in Japanese Patent No. 3152903 is provided with a control section for reading the control information, such as encoding system, which is added to the image data recorded on the recording medium as shown in FIG. 20(b). The control section selects from a plurality of built-in decoding devices of the digital camera, a decoding device corresponding to an encoding system of the encoded data, so as to reproduce the image data.

Further, as also shown in FIG. 19, a current memory card can allow data to be recorded on and reproduced from the memory card when inserted into any device having a corresponding built-in card slot, such as both a DVC and a facsimile machine which have completely different uses from each other, for example, other than the digital camera.

In this example, it is assumed that the DVC records an image. If, in advance, a taken image is intended to be sent a desired person via the facsimile machine, the DVC records the image using a still image mode and using a selected encoding system that allows the facsimile machine to reproduce the image. Here, by recording encoded data of the taken image on the memory card and inserting the memory card into the facsimile machine, it is possible to allow the facsimile machine to reproduce the encoded data, so as to send the taken image to the desired person.

However, in the cases as described above, before taking the image, the user is required to know and designate the type (such as moving image, still image, sound, audio, and text) and encoding system of content that the reproducing apparatus can reproduce.

Further, even if two devices, such as a portable phone and a DVC both capable of handling moving images, can handle moving images and comply with the same encoding method, the two devices may differ from each other in terms of conditions including a processing capability such as a image size, bit rate, and frame rate, as well as the number of mounted encoding tools. Thus, if moving images taken by the DVC is to be reproduced by a portable phone having a limited processing capability, it is necessary to designate encoding conditions in accordance with the processing capability of the reproducing apparatus (portable phone).

In order to guarantee compatibility between different types of devices, the MPEG-2 and MPEG-4 standards employ a concept of profile and level, and compatibility mode is defined in the standard for SD card. However, the compatibility defined here is such that a device supporting a high profile, level, or mode must reproduce a content complying with a lower profile, level, or mode.

Therefore if a profile, level, or mode of the recording apparatus is higher than that of the reproducing apparatus, it is necessary to encode and record a content in accordance with the profile, level, or mode of the reproducing apparatus so as to allow the reproducing apparatus to reproduce the recorded content. However, it is difficult for the user to know all the profile, level, or mode which is defined in a plurality of types.

Further, the two conventional techniques as described above are inconvenient because it is not possible to know whether or not the content recorded on the memory card can be reproduced by a reproducing apparatus until the memory card is actually inserted into the reproducing apparatus.

In view of the foregoing problems, an example embodiment presented herein has a feature to provide a content recording/reproducing system, a content reproducing apparatus, a content recording apparatus, and a content re-coding apparatus which are capable of reproducing a content recorded on a recording medium without requiring the user to designate a type of content, an encoding method of content, an encoding parameter, or the like.

DISCLOSURE

A removable recording medium of a first embodiment of the present application having an area for storing a content and, when attached to a reproducing apparatus, allowing the content recorded in the area to be reproduced is arranged so as to include, separately from the area for storing the content, an area for storing one or more conditions that allow the content to be reproduced by the reproducing apparatus.

Further, the recording apparatus is arranged so that a plurality of the reproducing conditions are registered in the area for storing the one or more conditions that allow the content to be reproduced by the reproducing apparatus; and a plurality of contents respectively corresponding to the plurality of the reproducing conditions are recorded in the area for storing the content.

The recording medium is arranged so as to include an area for recording information indicating which condition a recording apparatus should refer to from the one or more conditions that allow the content to be reproduced by the reproducing apparatus.

The recording medium is arranged so that the information indicating which condition the recording apparatus should refer to indicates one of the one or more conditions that is most recently registered on the recording medium.

The recording medium is arranged so that the one or more conditions that allow the content to be reproduced by the reproducing apparatus include at least a type of a content to be reproduced.

The recording medium is arranged so that the one or more conditions that allow the content to be reproduced by the reproducing apparatus include at least an encoding system of a content to be reproduced.

The recording medium is arranged so that the one or more conditions that allow the content to be reproduced by the reproducing apparatus include at least a processing capability of the reproducing apparatus.

A content recording apparatus of a second embodiment of the present application encoding a content and recording the content on a removable recording medium is arranged so as to include a section for reading out before recording the content, one or more conditions that allow the content to be reproduced, the one or more conditions being pre-registered on the recording medium; and a section for setting one or more encoding conditions of encoding the content in accordance with the read out one or more conditions.

The content recording apparatus is arranged so as to further include a section for re-coding in accordance with the set one or more conditions of encoding the content, a received content into an encoded content reproducible by a reproducing apparatus, if the received content has been already encoded.

The content recording apparatus is arranged so that, if a plurality of reproducing conditions as the one or more conditions that allow the content to be reproduced are registered on the recording medium, one of the plurality of registered reproducing conditions is selected, and the one or more encoding conditions are set so as to correspond the selected one of the plurality of reproducing conditions.

The content recording apparatus is arranged so that, if a plurality of reproducing conditions as the one or more conditions that allow the content to be reproduced are registered on the recording medium, the one or more encoding conditions are set so as to correspond to the plurality of registered reproducing conditions.

The content recording apparatus is arranged so that, if a plurality of reproducing conditions as the one or more conditions that allow the content to be reproduced are registered on the recording medium, one or more encoding conditions that are employable by the content recording apparatus are selected from the one or more encoding conditions that are set in accordance with the plurality of registered reproducing conditions, and the content is encoded and recorded in accordance with the selected one or more encoding conditions.

The content recording apparatus is arranged so that the one or more conditions of encoding the content are determined in accordance with information indicating which one or more conditions the content recording apparatus should refer to from the one or more conditions that allow the content to be reproduced which are pre-registered on the recording medium.

A content reproducing apparatus of a third embodiment of the present application reading out a content recorded on a removable recording medium and reproducing the content after applying predetermined signal processing to the content is arranged so as to include a section for storing a condition that allows the content to be reproduced by the content reproducing apparatus; and a section for registering the condition on the recording medium.

The content reproducing apparatus is arranged so that the content reproducing apparatus records on the recording medium when registering on the recording medium the reproducing condition that allows the content to be reproduced by the content reproducing apparatus, information indicating whether or not the reproducing condition is a condition that a recording apparatus should refer to.

In the example embodiment presented herein, the recording apparatus automatically reads out information pre-written onto the recording medium, the information indicating a type of content, an encoding system of content, a reproducing capability, etc., that can be handled by the reproducing apparatus; and then sets an encoding parameter, etc., in accordance with the read out information. With this, the user does not need to designate a type, an encoding system, an encoding parameter, etc., of content, and the reproducing apparatus can surely reproduce in a normal manner, any content recorded on the recording medium.

Further, in the example embodiment, since the recording apparatus reads the information stored in the recording medium, the recording apparatus can know the reproducing capability of the reproducing apparatus in advance. With this, by re-coding an existing content (encoded data) using an encoding system and encoding parameter that can be handled by the reproducing apparatus, the recording apparatus can record on the recording medium, a content that can be reproduced by the desired reproducing apparatus.

Further, in the example embodiment, even if there are a plurality of reproducing apparatuses, multiple pieces of the information respectively corresponding to the reproducing apparatuses may be registered on the recording medium, and an content storage area in the recording medium may be arranged to have a plurality of directories respectively corresponding to the reproducing apparatuses. With this, it is possible to record on the recording medium, a content that can be reproduced by a desired one of the reproducing apparatuses. Further, the user can easily select a reproducing apparatus by selecting from a list of choices of the reproducing apparatuses, for example.

A content recording apparatus of a fourth embodiment of the present application encoding a content and recording the content on a removable recording medium is arranged so as to include a section for reading out before the content recording apparatus records the content, a directory name created on the recording medium; and a section for setting in accordance with the read out directory name, a condition of encoding the content.

The directory name is a name with which the reproducing apparatus can be specified. By reading the directory name, the recording apparatus can specify the reproducing apparatus. By specifying the reproducing apparatus, the recording apparatus can select an encoding system that can be handled by the reproducing apparatus, and then encode the content.

Namely, the recording apparatus specifies the reproducing apparatus based on a directory name created on the recording medium, sets an encoding parameter corresponding to the specified reproducing apparatus, and records encoded data in a directory having the directory name. With this, the user does not need to designate the encoding system and encoding parameter of content, etc., and the reproducing apparatus can surely reproduce in a normal manner, any content recorded in the directory on the recording medium.

A content recording apparatus of a fifth embodiment of the present application encoding a content and recording the content on a removable recording medium is arranged so as to include a section for reading out before the content recording apparatus records the content, a content file name recorded on the recording medium; and a section for setting in accordance with the read out file name, a condition of encoding the content.

The file name is a name with which the reproducing apparatus can be specified. By reading the file name, the recording apparatus can specify the reproducing apparatus. By specifying the reproducing apparatus, the recording apparatus can select an encoding system that can be handled by the reproducing apparatus, and then encode the content.

Namely, the recording apparatus specifies the reproducing apparatus based on a content file name created on the recording medium, and sets an encoding parameter corresponding to the specified reproducing apparatus. With this, the user does not need to designate the encoding system and encoding parameter of content, etc., and the reproducing apparatus can surely reproduce in a normal manner, any content recorded on the recording medium.

A content recording apparatus of a sixth embodiment of the present application downloading a content via a communications network and recording the content on a removable recording medium is arranged so as to include a section for reading out from the recording medium before the content recording apparatus downloads the content, a pre-registered condition that allows the content to be reproduced; and a section for setting in accordance with the read out condition, a condition of downloading the content.

With this arrangement, the recording apparatus automatically reads out information pre-written onto the recording medium, the information indicating a type of content, an encoding system of content, a reproducing capability, etc., that can be handled by the reproducing apparatus; and then downloads in accordance with the read out information, a content that conforms to the information. With this, the user does not need to designate a type, an encoding system, an encoding parameter, etc., of content, and the reproducing apparatus can surely reproduce in a normal manner, any content recorded on the recording medium.

A content recording/reproducing system of a seventh embodiment of the present application, including a content recording apparatus for recording a content on a removable recording medium, and a content reproducing apparatus for reproducing the content recorded on the recording medium, is arranged so that the content reproducing apparatus records on the recording medium, capability information regarding a content reproducing capability of the content reproducing apparatus; and the content recording apparatus analyzes the capability information recorded on the recording medium, and records on the recording medium, only a content that does not exceed the content reproducing capability of the content reproducing apparatus.

A content reproducing apparatus of an eighth embodiment of the present application for reproducing a content recorded on a recording medium is arranged so as to include a reproducing capability storing section for storing capability information regarding a content reproducing capability of the content reproducing apparatus; a capability information recording section for recording on the recording medium, the capability information as a capability information file; and a file management section for recording on the recording medium, management information which associates the capability information file with a content.

The content reproducing apparatus is arranged so that the file management section includes a capability information searching section for searching for a capability information file recorded on the recording medium; a capability information retrieving section for retrieving capability information in the capability information file that is searched for; and a capability information comparing section for comparing (A) the capability information of the content reproducing apparatus, which is stored in the reproducing capability storing section, with (B) the capability information retrieved by the capability information retrieving section, the file management section recording to the capability information file recorded on the recording medium, a portion of the capability information (A) that is not recorded on the recording medium, so as to update the management information.

The content reproducing apparatus is arranged so that the file management section searches for the capability information file of the content reproducing apparatus from capability information files pre-recorded on the recording medium; and, with reference to the management information pre-recorded on the recording medium, selecting and reproducing the content associated with the capability information file that is searched for.

The content reproducing apparatus is arranged so that the capability information recording section records as the capability information in the capability information file, a type of the content reproducing apparatus.

The content reproducing apparatus is arranged so as to include a reproducibility judgment section for judging whether or not a content pre-recorded on the recording medium is reproducible by the content reproducing apparatus, the capability information recording section recording to the capability information file, a judgment result obtained by the reproducibility judgment section as the capability information of the content reproducing apparatus.

A content recording apparatus of a ninth embodiment of the present application for accessing a recording medium and recording a content on the recording medium is arranged so as to include a file management section for, in accordance with management information pre-recorded on the recording medium, searching for a plurality of capability information files pre-recorded on the recording medium; a capability information selecting section for selecting one of the plurality of capability information files; a capability information reading out section for reading out from the selected one of the plurality of capability information files, capability information regarding a content reproducing capability of a content reproducing apparatus that recorded the selected one of the plurality of capability information files; and a parameter setting section for setting a parameter to be used by the content recording apparatus in recording the content, the content recording apparatus creating only a content that does not exceed the content reproducing capability of the content reproducing apparatus.

The content recording apparatus is arranged so that the file management section records on the recording medium in accordance with the management information pre-recorded on the recording medium, the content created by the content recording apparatus so as to be associated with the one of the plurality of capability information files that is selected by the capability information selecting section.

The content recording apparatus is arranged so that the capability information selecting section reads out content reproducing apparatus types respectively from the plurality of capability information files that are searched for by the file management section, and selects the one of the plurality of capability information files so as to correspond to the content reproducing apparatus that is specified.

A content re-coding apparatus of a tenth embodiment of the present application for accessing a recording medium and re-coding a content is arranged so as to include a file management section for, in accordance with management information pre-recorded on the recording medium, searching for capability information files pre-recorded on the recording medium; a capability information selecting section for selecting one of the capability information files; a capability information reading out section for reading out from the selected one of the capability information files, capability information regarding a content reproducing capability of a content reproducing apparatus; and a parameter setting section for setting a parameter to be used by the recording apparatus in recording the content, the content re-coding apparatus creating only a content that does not exceed the content reproducing capability of the content reproducing apparatus that recorded the selected one of the capability information files.

The content re-coding apparatus is arranged so that the content re-coding apparatus reads out judgment results as to content reproducibility respectively from the capability information files pre-recorded on the recording medium; and selects as a content to be re-coded from contents pre-recorded on the recording medium, a content that is not reproducible by the content reproducing apparatus that recorded the selected one of the capability information files.

With the content recording/reproducing system, content reproducing apparatus, content recording apparatus, and content re-coding apparatus in accordance with the present invention, the content recording apparatus automatically reads out information pre-written onto the memory card, the information indicating a type of content, an encoding system of content, a reproducing capability, etc., that can be handled by the reproducing apparatus; and then sets an encoding parameter, etc., in accordance with the read out information. With this, the user does not need to designate a type, an encoding system, an encoding parameter, etc., of content, and the content reproducing apparatus can surely reproduce in a normal manner, any content recorded on the memory card.

Further, since the content recording apparatus reads the information stored in the memory card, the content recording apparatus can know the reproducing capability of the content reproducing apparatus in advance. With this, by re-coding an existing content (encoded data) using an encoding system and encoding parameter that can be handled by the reproducing apparatus, the recording apparatus can record on the memory card, a content that can be reproduced by the desired reproducing apparatus.

Further, even if there are a plurality of content reproducing apparatuses, multiple pieces of the information respectively corresponding to the content reproducing apparatuses may be registered on the memory card, and an content storage area in the memory card may be arranged to have a plurality of directories respectively corresponding to the content reproducing apparatuses. With this, it is possible to record on the memory card, a content that can be reproduced by a desired one of the content reproducing apparatuses. Further, the user can easily select a reproducing apparatus by selecting from a list of choices of the content reproducing apparatuses, for example.

For a fuller understanding of the nature and advantages of the example embodiment presented herein, reference should be made to the ensuing detailed description taken in conjunction with the accompanying drawings.

BRIEF DESCRIPTION OF DRAWINGS

FIG. 3 is a program showing an example of a capability table.

BEST MODE FOR CARRYING OUT THE INVENTION

First Embodiment

The following will explain an embodiment with reference to the drawings. Note that, the present invention is not limited to this.

Figure 1:
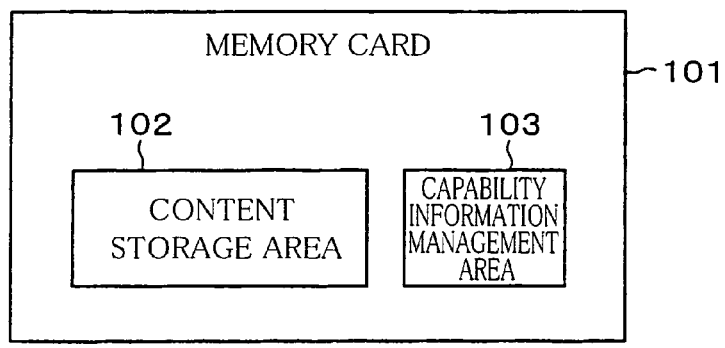
FIG. 1 is a diagram showing a memory card in accordance with an embodiment.

FIG. 1 shows a memory card (recording medium) used in First Embodiment. A memory card 101 is provided with a capability information management area 103 which records information of a capability table to be described later; and a content storage area 102 which stores encoded data (content) created by a recording apparatus.

Figure 2:
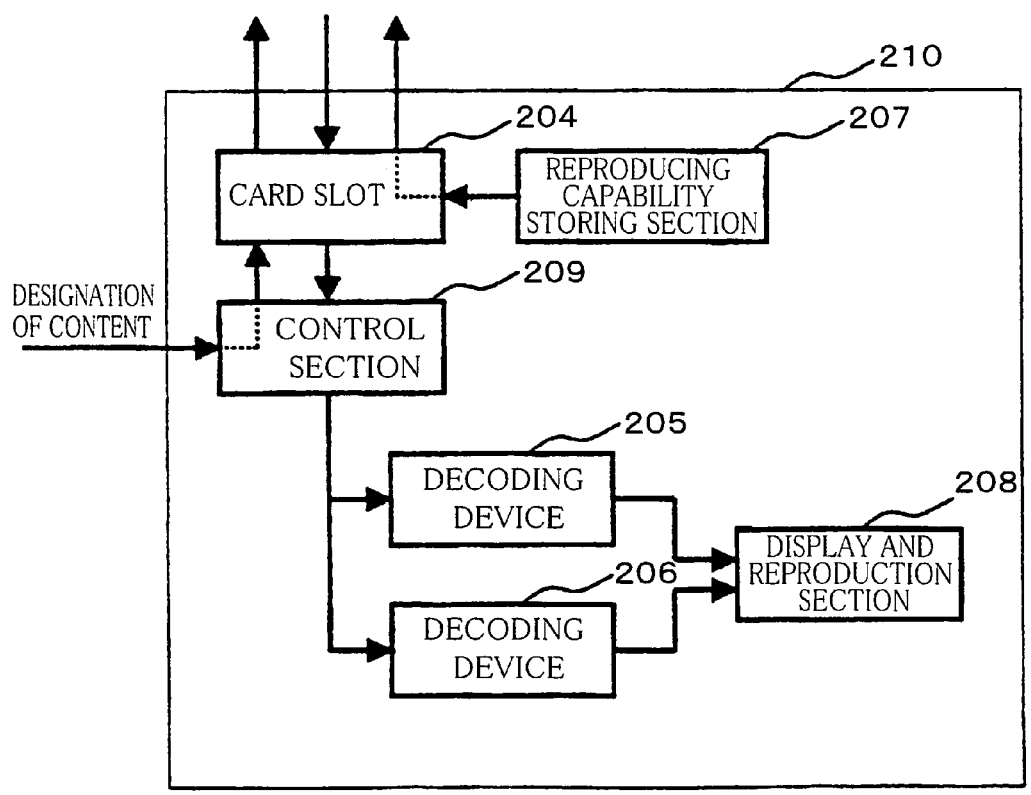
FIG. 2 is a block diagram showing an example of a reproducing apparatus in accordance with an embodiment.

FIG. 2 shows a reproducing apparatus 210 in First Embodiment. FIG. 2 shows a card slot 204 to which the memory card 101 is attached, a control section 209 which reads out a user-designated content from the content storage area 102 of the memory card 101 and supplies the read out content to decoding devices 205 and 206.

The decoding devices 205 and 206 (respectively for different contents or in different systems) decode the encoding content read out from the memory card 101. A reproducing capability storing section 207 stores reproducing conditions that allow a content to be reproduced by the reproducing apparatus 210. A display and reproduction section 208 reproduces and displays the content decoded by the decoding devices 205 and 206.

Note that, First Embodiment describes the example where the reproducing apparatus 210 includes the two types of different decoding devices 205 and 206, but the type of decoding devices in the reproducing apparatus 210 is not limited to this.

The information of the capability table is stored in the reproducing capability storing section 207 of the reproducing apparatus 210 shown in FIG. 2, and indicates a reproducing capability of the reproducing apparatus. The information is written from the reproducing capability storing section 207 into the capability information management area 103 of the memory card 101 when the memory card 101 is inserted into the reproducing apparatus 210.

Alternatively, the above-described operation may be omitted if the memory card 101 is a dedicated card whose capability information management area 103 has already recorded capability data. Such a dedicated card can indicate the reproducing capability of the reproducing apparatus using not only the capability table or a general-purpose profile, level, or mode, but also a mode unique to the reproducing apparatus.

The information of the capability table will be concretely explained. The capability table records information such as the name (type name) of the reproducing apparatus, the type of reproducible content (such as audio, sound, still image, moving image, and text), the reproducing capability (such as encoding system, size, bit rate, and sampling frequency). Table 1 shows an example of entries that can be recorded in the capability table.

TABLE 1

| ENTRIES RECORDED IN CAPABILITY TABLE | | | |
|---|---|---|---|
| NAME OF REPRODUCING APPARATUS | | | DVC, DIGITAL CAMERA, TV, PC |
| TYPE OF CONTENT | | | AUDIO, MOVING IMAGE, STILL IMAGE, SOUND, TEXT |
| REPRODUCING CAPABILITY | AUDIO | ENCODING SYSTEM SAMPLING FREQUENCY BIT RATE | AAC/MP3/WMA/ G.726/WAVE |
| | MOVING IMAGE | ENCODING SYSTEM | MPEG-4/ MPEG-2/ Motion-JPEG |
| | | BIT RATE SIZE PROFILE AND LEVEL | |
| | STILL IMAGE | ENCODING SYSTEM | JPEG(Exif)/ BMP/GIF/ PNG |
| | | SIZE PIXEL SAMPLING | 4:2:0/4:2:2/ 4:4:4 |
| | SOUND | ENCODING SYSTEM SAMPLING FREQUENCY BIT RATE | G.726/AMR |
| | TEXT | | |

Further, Table 2 shows an example of the capability table recorded in the capability information management area 103 when the present invention is applied to a digital camera.

TABLE 2

| EXAMPLE OF CAPABILITY TABLE | | | |
|---|---|---|---|
| NAME OF REPRODUCING APPARATUS | | | DIGITAL CAMERA |
| TYPE OF CONTENT | | | STILL IMAGE, SOUND |
| REPRODUCING CAPABILITY | STILL IMAGE | ENCODING SYSTEM | JPEG(Exif)/ BMP |
| | | SIZE | 160 × 120 TO 2560 × 1920 |
| | | PIXEL SAMPLING | 4:2:0/4:2:2 |
| | SOUND | ENCODING SYSTEM | G.726 |
| | | SAMPLING FREQUENCY | 8 kHz |
| | | BIT RATE | 16 kbps |

The capability table may record the profile, level (such as MP@ML), or mode as mentioned earlier, instead of recording the reproducing capability such as encoding system and size as shown in Table 2.

If the entries in Table 2 are to be used by a digital camera as the reproducing apparatus 210 shown in FIG. 2, the entries of Table 2 are automatically written from the reproducing capability storage area 207 into the capability information management area 103 of the memory card 101 when the memory card 101 is inserted into the card slot 204 of the reproducing apparatus (digital camera) 210.

Further, FIG. 3 shows a capability table in program form as a further example. The capability table indicated by the program of FIG. 3 sequentially records a parameter name (such as size, pixel sampling, sampling frequency, and bit rate) in association with corresponding reproducible value(s). The number following CONTENT indicates the number of types of reproducible content. FIG. 3 shows a case where two types of contents are reproducible. In similar manners, the size, pixel sampling, sampling frequency, and bit rate are respectively shown. If a program representing the capability table uses a format that records a parameter name, the number of types of the parameter, and parameter value(s) in a set, as shown in FIG. 3, it is possible to update the capability table such that a parameter "bit rate" is easily added later under ENCODING SYSTEM of STILL IMAGE, for example.

Note that, if a reproducible parameter value is within a certain range, as in the capability table shown in Table 2, a parameter value that can be recorded by a recording apparatus may be selected appropriately from the reproducible parameter value. Further, if there are a plurality of reproducible parameter values, as in the capability table shown in FIG. 3, a value listed earlier may be selected by priority.

With respect to the size, for example, the reproducible parameter values may be checked sequentially from SUXGA until a value that can be recorded by the recording apparatus is found and selected. If the recording apparatus only complies with an image whose size is not more than XGA, XGA is selected after SUXGA, UXGA, and SXGA are sequentially checked.

Alternatively, the capability table may be registered on the memory card 101 in such a manner that the user copies to the capability information management area 103, information of the capability table pre-stored in a PC, etc.; or the user inputs the entries of Table 2 into the capability information management area 103 by use of a PC, etc., for example.

Note that, the foregoing operation must be carried out once before a recording apparatus different from the reproducing apparatus 210 creates or takes a content to be reproduced by the reproducing apparatus 210 and stores the content in the content storage area 102 of the memory card 101. The foregoing operation must be carried out before the user uses a reproducing apparatus whose type is different from that of the reproducing apparatus 210, because a capability table of the reproducing apparatus differs from that of the reproducing apparatus 210.

Figure 4:
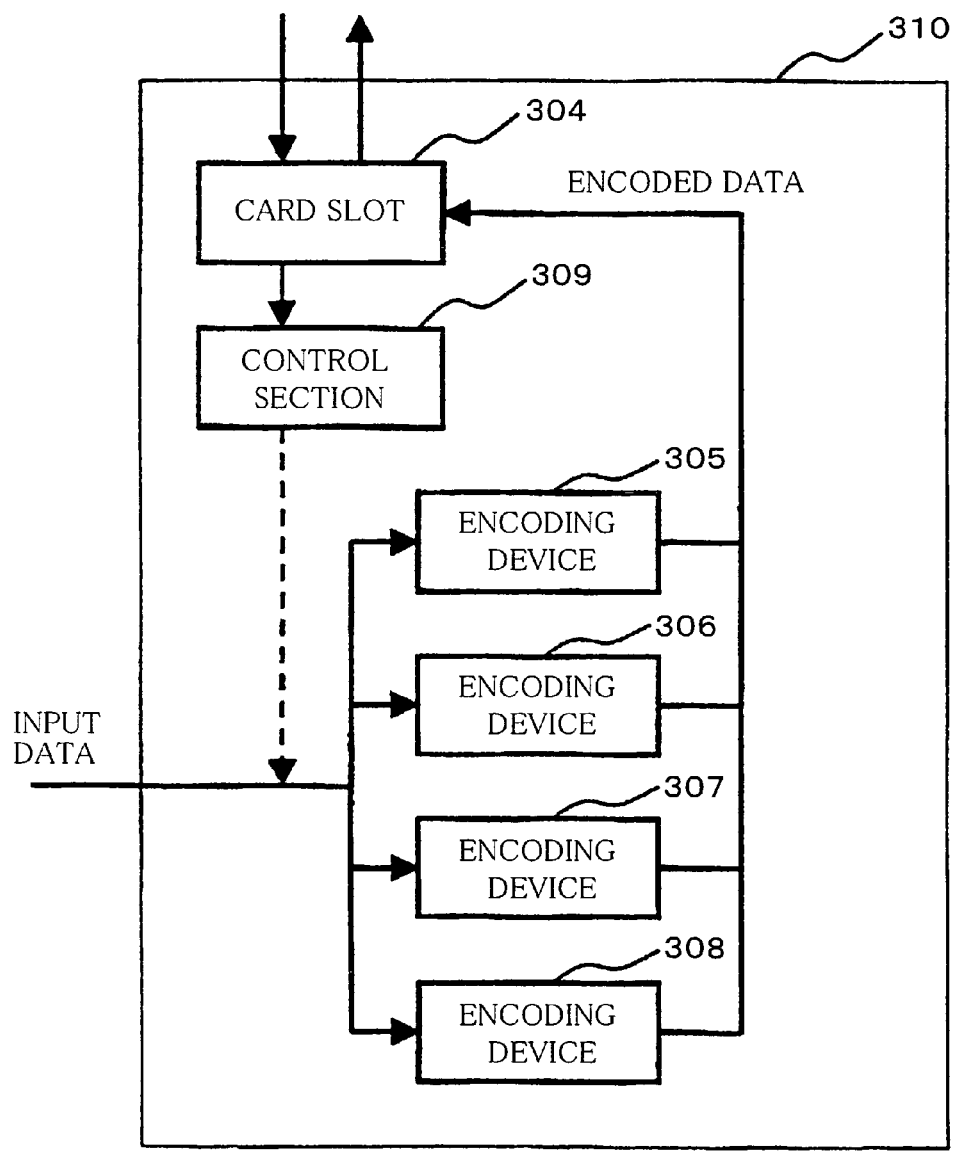
FIG. 4 is a block diagram showing an example of a recording apparatus in accordance with an embodiment.

The following will explain the operation of a recording apparatus shown in FIG. 4 when the memory card 101 whose capability information management area 103 records the entries of Table 2 is used. FIG. 4 shows a recording apparatus 310 which encodes input data and creating a content (encoded data). The recording apparatus 310 writes the content (encoded data) into the content storage area 102 of the memory card 101 via a built-in card slot 304.

A control section 309 of the recording apparatus 310 reads out information of the capability table from the capability information management area 103 of the memory card 101, selects one of encoding devices 305 through 308 (respectively for different contents or in different systems) that corresponds to the information of the capability table, and controls the encoding of the input data based on the capability table.

Note that, the present embodiment describes the example where the recording apparatus 310 includes four types of encoding devices 305 through 308, but the type of encoding devices in the recording apparatus 310 is not limited to this.

The following explanation assumes that, in FIG. 4, the recording apparatus 310 is a DVC for use with memory card, the encoding device 305 is an MPEG-2 encoding device, the encoding device 306 is a G. 726 encoding device, the encoding device 307 is an AAC encoding device, and the encoding device 308 is a JPEG (Exif) encoding device.

The memory card 101 has already registered the capability table of the reproducing apparatus (digital camera). First, based on entries in the capability table read out from the capability information management area 103 of the memory card 101, the control section 309 of the recording apparatus 310 recognizes that the reproducing apparatus is a digital camera, the contents are still image and sound, and the encoding systems for the still image and sound are JPEG (Exif) and G. 726, respectively.

Next, the control section 309 selects the JPEG (Exif) encoding device 308 and the G. 726 encoding device 306 from the encoding devices in the recording apparatus 310, and supplies the input data to the encoding devices 308 and 306. Here, as the JPEG (Exif) encoding parameters, a size in the range of from 160×120 to 2560×1920 as recorded in the capability table of Table 2 is selected, and either 4:2:2 or 4:2:0 is selected as the pixel sampling.

If a capability value in the capability table is in a selectable range, a default value pre-set in the recording apparatus 310 may be used if the default value falls within the capability values of the encoding devices. Alternatively, selected may be a maximum value that satisfies both the values in the capability table and the capability values of the encoding devices; a value corresponding to the format of the input data; or a value designated by the user.

The sampling frequency of 8 kHz and the bit rate of 16 kbps, both of which are recorded in the capability table, are used as the G. 726 encoding parameters. The thus encoded data (content) of the still image (JPEG (Exif)) and the sound (G. 726) is recorded in the content storage area 102 of the memory card 101.

The following will explain a case where the content recorded on the memory card 101 is reproduced by the reproducing apparatus 210 shown in FIG. 2. The following explanation will assume that the decoding apparatus 210 is a digital camera in accordance with the capability table of Table 2. Namely, the decoding device 205 is a JPEG (Exif) decoding device and the decoding device 206 is a G. 726 decoding device.

The reproducing apparatus (digital camera) 210 reads out via the control section 209, a user-designated content from contents recorded in the content storage area 102 of the memory card 101. Then, the decoding devices 205 and 206 decode the encoded still image data and the encoded sound data, respectively, and output decoded data to the display and reproduction section 208.

Here, the user may designate the content by selecting from a list or thumbnails of the contents recorded on the memory card 101 when the list or thumbnails is displayed on the display and reproduction section 208.

The capability table recorded on the memory card 101 and used by the recording apparatus 310 in encoding and recording the content is originally written by the reproducing capability storing section 209 of the reproducing apparatus 210 when the memory card 101 is inserted into the reproducing apparatus 210, and indicates capability values of the reproducing apparatus 210. The content recorded on the memory card 101 is therefore encoded and recorded within a type reproducible by the reproducing apparatus 210 and within a processing capability of the reproducing apparatus 210. Hence, the content recorded on the memory card can be reproduced by the reproducing apparatus 210 without problems.

As explained above, in the present embodiment, the memory card 101 pre-records information of a processing capability (such as a type of content, an encoding system of content, and processing capability values that allow reproduction) of the reproducing apparatus 210, and the recording apparatus 310 automatically creates a content that meets the information of the processing capability. With this, the reproducing apparatus 210 can surely reproduce a content recorded on the memory card 101.

Second Embodiment

The following will explain another embodiment. In First Embodiment as described above, the input data is image data, sound data, or other data picked up from a CCD or microphone. In contrast, Second Embodiment will explain a case where a content that has been already encoded is re-coded in consideration of encoding parameters so that the reproducing apparatus can reproduce the content. For simplicity, it is assumed in this case that the type of the content is only moving image, and encoding parameters only for the moving image will be explained.

Table 3 shows an example of compatibility modes of an SD memory card.

TABLE 3

EXAMPLE OF COMPATIBILITY MODES

| MODE | IMAGE SIZE | FRAME RATE | BIT RATE |
| --- | --- | --- | --- |
| C4 | UP TO CIF | UP TO 15 fps | UP TO 384 kbps |
| C3 | UP TO 240 × 176 | UP TO 15 fps | UP TO 384 kbps |
| C2 | UP TO QCIF | UP TO 15 fps | UP TO 384 kbps |
| C1 | UP TO QCIF | UP TO 15 fps | UP TO 64 kbps |

The encoding system in this example is MPEG-4, but is divided into four modes depending on the processing capability of the reproducing apparatus. A reproducing apparatus supporting the highest mode C4 is capable of reproducing at a frame rate of 15 fps (frame/second), a CIF size image encoded at a bit rate of 384 kbps. On the other hand, a reproducing apparatus supporting only the lowest mode C1 is only capable of reproducing at a frame rate of 15 fps, a QCIF size image encoded at a bit rate of 64 kbps.

Therefore a reproducing apparatus supporting C4 can reproduce a content created by a recording apparatus supporting any of the modes C1 through C4. In contrast, a reproducing apparatus supporting only C1 cannot properly reproduce a content corresponding to C4 due to the occurrence of frame missing or the discontinuing of reproduction, etc., because the content exceeds the processing capability of the reproducing apparatus.

In other words, in order to allow a reproducing apparatus supporting only C1 to reproduce a content corresponding to C4, it is necessary to re-code the content in accordance with encoding parameters conforming to the processing capability for C1, so as to re-create the content.

Figure 5:
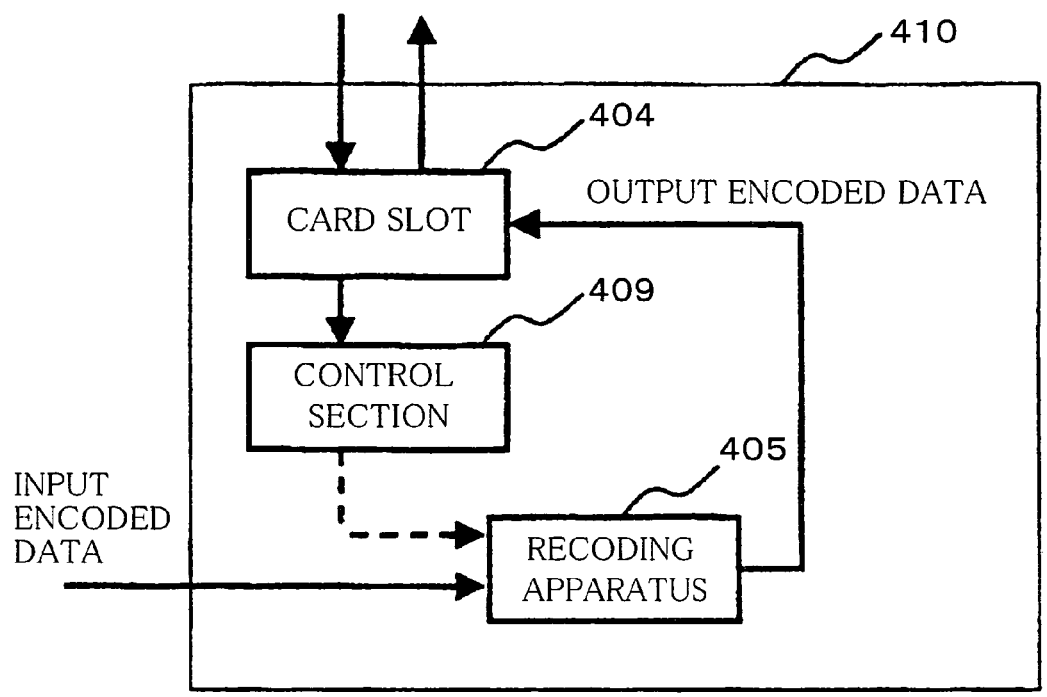
FIG. 5 is a block diagram showing an example of a recording apparatus in accordance with an embodiment.

FIG. 5 is a block diagram showing a recording apparatus of Second Embodiment. FIG. 5 shows a recording apparatus 410 for receiving and re-coding encoded data (content), and recording the re-coded content on the memory card 101. In this case, the input data has been already encoded by another recording apparatus (not shown).

It is assumed here that the other recording apparatus (not shown) is a DVC for use with memory card supporting C4 and the reproducing apparatus is a portable phone supporting C1. It is also assumed here that information of the reproducing apparatus (portable phone) is recorded as a capability table in the capability information management area 103 when the memory card 101 is inserted into the reproducing apparatus (portable phone) as in First Embodiment. Table 4 shows an example of the capability table here.

TABLE 4

EXAMPLE OF CAPABILITY TABLE

| NAME OF REPRODUCING APPARATUS | | | PORTABLE PHONE |
| --- | --- | --- | --- |
| TYPE OF CONTENT | | | MOVING IMAGE, SOUND |
| REPRODUCING CAPABILITY | MOVING IMAGE | ENCODING SYSTEM | MPEG-4 |
| | | BIT RATE | UP TO 64 kbps |
| | | SIZE | UP TO QCIF |
| | | FRAME RATE | UP TO 15 fps |
| | SOUND | ENCODING SYSTEM | G.726 |
| | | SAMPLING FREQUENCY | 8 kHz |
| | | BIT RATE | 16 kbps |

A control section 409 in FIG. 5 reads out the capability table (Table 4) from the memory card 101, and sets encoding parameters of a re-coding apparatus 405 in accordance with the capability table. Here, the encoding parameters are such that the image size is QCIF, the bit rate is 64 kps, and the frame rate is 15 fps.

The re-coding apparatus 405 decodes the input encoded data so as to reproduce moving image data; re-codes the reproduced moving image data in accordance with the encoding parameters set by the control section 409; and records the encoded data (content) in the content storage area 102 of the memory card 101. Specifically, the reproduced moving image data is re-coded such that the size is reduced from CIF to QCIF, the target bit rate is set to 64 kbps, and the frame rate is 15 fps.

Here, the re-coding apparatus 405 may completely reproduce the encoded data before re-coding the reproduced moving image data, or may re-code the original encoded data only by re-creating a portion of the data other than information such as motion vector which requires high throughput. Further, FIG. 5 shows only one type of re-coding apparatus, but the recording apparatus 410 may include a plurality of re-coding apparatuses respectively having different re-coding systems.

The content thus recorded on the memory card 101 can be reproduced by a reproducing apparatus (portable phone) supporting C1.

As described above, the processing capability that the reproducing apparatus can reproduce is pre-recorded on the memory card. With this, the content is re-coded using encoding parameters that are within the processing capability of the reproducing apparatus, so that the content (encoded data) that the reproducing apparatus cannot support can be recorded on the memory card after being converted into a content that the reproducing apparatus can reproduce.

Note that, the foregoing described the case where the encoding system for the re-coding is the same with that for the encoding. However, some arrangements of the re-coding apparatus 405 allow the encoding system of the content to change from MPEG-4 to MPEG-2. Further, the type of the target content is not limited to moving image, and may be sound, audio, or still image.

Note that, the reproducing apparatus of Second Embodiment may be arranged the same as the reproducing apparatus 210 of FIG. 2. Here, the reproducing capability storing section 207 stores the information of the capability table of Table 4, and the decoding device 205 is an MPEG-4 decoding device. Namely, the capability table of Table 4 is recorded on the memory card 101 using the reproducing apparatus 210, before the recording apparatus 410 performs the re-coding.

Third Embodiment

The following will explain a further embodiment. First and Second Embodiments as described above described the cases where, with respect to only one type of reproducing apparatus, a capability table indicating a type of content and a processing capability that allow reproduction is pre-registered on the memory card, and the recording apparatus reads out information of the capability table from the memory card so as to perform encoding and recording in accordance with the information thus read.

On the other hand, Third Embodiment will explain an example where a plurality of user-held reproducing apparatuses such as a TV, PC, DVC, digital camera, portable phone, and car audio system can be handled.

In a first method of Third Embodiment, when the user switches from a reproducing apparatus A to another reproducing apparatus B, the capability table B for the reproducing apparatus B is overwritten on the capability table A for the reproducing apparatus A which is recorded in the capability information management area 103 of the memory card 101. After this, the recording apparatus encodes and records on the memory card 101, a content to be reproduced by the reproducing apparatus B.

When the capability table B is written onto the memory card 101, the content for the reproducing apparatus A which has been recorded on the memory card 101 may be either erased, retained, or transferred into a directory for the capability table A specially created in the content storage area 102 of the memory card 101.

Further, in second and third methods of the present embodiment as described below, if a plurality of reproducing conditions that allow the content to be reproduced are registered on the recording medium, one or more encoding conditions that can be employed by the recording apparatus in question are selected from encoding conditions that correspond to the registered reproducing conditions, and the content is encoded and recorded in accordance with the selected encoding condition(s).

The second method is such that the capability information management area 103 of the memory card 101 stores a plurality of capability tables, and the user selects when recording the content, which one of the reproducing apparatuses to use for the reproducing (namely, which one of the capability tables to use for the recording).

Figure 6:
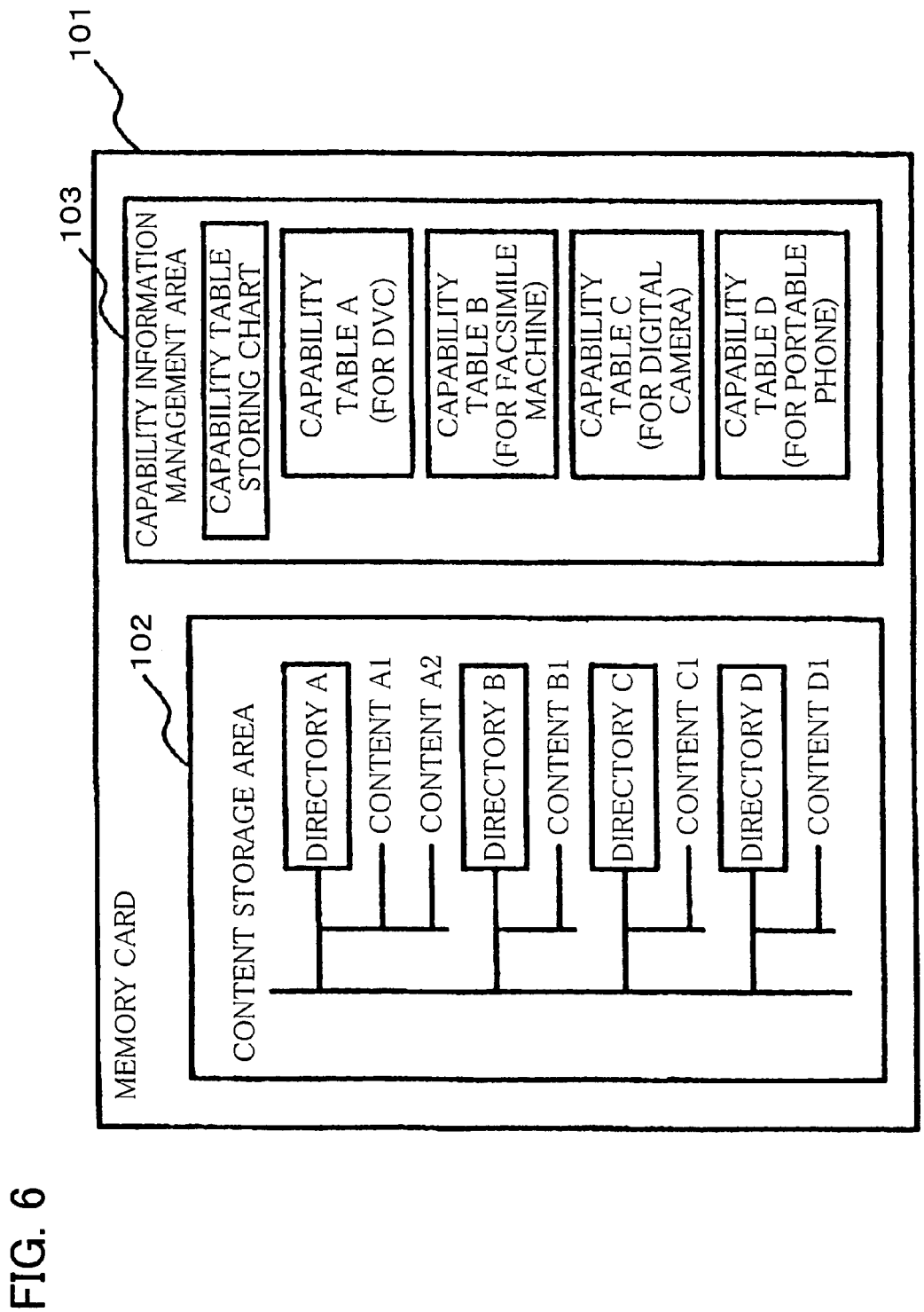
FIG. 6 is an explanatory diagram showing an example of (i) information of the capability table and (ii) contents which are recorded on the memory card in accordance with an embodiment.

This method will be explained with reference to FIG. 6. FIG. 6 shows an example where the capability information management area 103 of the memory card 101 stores four types of capability tables respectively for DVC, facsimile, digital camera, and portable phone. Here, directories respectively corresponding to the capability tables that are stored in the capability information directory B, for example.

The capability table that the recording apparatus uses in the recording may be selected in a following method. Namely, the memory card 101 is inserted into the reproducing apparatus 210 again before the recording, so that a capability table equal to or downwardly compatible with the capability table recorded in the reproducing capability storing section 207 is automatically selected from the plurality of capability tables registered on the memory card. In other words, the capability table to be referred to is the capability table of the reproducing apparatus into which the memory card is most recently inserted.

As another example, the method may be such that, before the recording apparatus records the content, the control section 209 of the reproducing apparatus 210 designates the capability table in accordance with instructions from the user (not shown). In this case, the capability table to be referred to is determined in accordance with the most recent instructions from the user. Here, the capability information management area 103 in FIG. 6 records information indicating which one of the capability tables is selected. As a further example, the method may be such that the control section 309 of the recording apparatus 310 shown in FIG. 4 designates the capability table in accordance with instructions from the user (not shown). The capability table to be referred to in these two examples, for example, is the capability table that is most recently selected from a plurality of capability tables registered on the memory card.

When the capability table that the recording apparatus uses in the recording is thus selected, information is added to the selected capability table by an application program pre-installed in the reproducing apparatus, the information indicating that the selected capability table is a condition that the recording apparatus should refer to.

Further, the user may register a plurality of capability tables in the capability information management area 103 by pre-registering when purchasing the memory card or other occasion, all of the reproducing apparatuses held by the user; or by sequentially adding a capability table before recording a content.

As described above, the capability information management area 103 of the memory card 101 can store a plurality of capability tables. Table 5 shows a detailed example of a method for storing the capability tables.

TABLE 5

EXAMPLE OF METHOD FOR STORING CAPABILITY TABLES
NUMBER OF CAPABILITY TABLES 4

| CAPABILITY TABLE | STARTING ADDRESS | SIZE | TYPE OF CONTENT | | | | |
|---|---|---|---|---|---|---|---|
| | | | AUDIO | MOVING IMAGE | STILL IMAGE | SOUND | TEXT |
| A | 0x1FB0 | 100 BYTES | | 0x1FB2 64 BYTES | | 0x1FF2 34 BYTES | |
| B | 0x2014 | 16 BYTES | | | 0x2016 14 BYTES | | |
| C | 0x2024 | 64 BYTES | | | 0x2026 48 BYTES | 0x2056 14 BYTES | |

TABLE 5-continued

EXAMPLE OF METHOD FOR STORING CAPABILITY TABLES
NUMBER OF CAPABILITY TABLES 4

| CAPABILITY TABLE | STARTING ADDRESS | SIZE | AUDIO | TYPE OF CONTENT | | | |
| --- | --- | --- | --- | --- | --- | --- | --- |
| | | | | MOVING IMAGE | STILL IMAGE | SOUND | TEXT |
| D | 0x2064 | 80 BYTES | | 0x2066<br>64 BYTES | | 0x20A6<br>14 BYTES | |

Table 5 shows an example of a capability table storing chart in the capability information storage area 103 shown in FIG. 6. The capability table storing chart of Table 5 records the number of capability tables, the starting address and size of each of the capability tables, and the starting address and size of each content in the capability tables. When a capability table is newly added, the number of capability tables is increased by 1, and the added capability table is added in the chart.

Table 5 shows that the capability table A starts from 0x1FB0 and has a total size of 100 bytes; a moving image content in the capability table A starts from 0x1FB2 and has a size of 64 bytes; and a sound content starts from 0x1FF2 and has a size of 34 bytes. Further, when a capability table is newly added, the number of capability tables is increased to 5, and the new capability table is added subsequently to the capability table D.

Note that, Table 5 shows an example where the chart records both the address and size of each of the capability tables, but the chart may includes only the address or the size of each of the capability tables.

By reading the capability table storing chart, the recording apparatus can use the address of a desired capability table and read entries in the desired capability table, and the reproducing apparatus can write a new capability table at the address of an unused area of the capability information storage area 103.

The third method of the present embodiment is such that the memory card 101 records contents in accordance with either a plurality of capability tables or all of the capability tables registered in the capability information management area 103. Though this is similar to the second method, the memory card 101 here records contents in accordance with all of the tables with respect to one input data without selecting any capability table.

In an example of FIG. 6, the input data is encoded at one time respectively using encoding parameters in accordance with capability tables A through D, and the encoded contents are written in respectively corresponding directories A through D in the content storage area 102 of the memory card 101. In this case, four types of contents respectively for DVC, facsimile, digital camera, and portable phone are recorded on the memory card 101 at one time with respect to one input data.

In this case, the user does not need to pre-select a particular capability table as in the second method. As another example, the user may select a plurality of capability tables corresponding to a plurality of desired reproducing apparatuses, so that only contents reproducible by the desired reproducing apparatuses are recorded in the content storage area 102 of the memory card 101.

The reproducing apparatus 210 reproduces a content by finding in the content storage area 102, a directory corresponding to the capability table that is recorded in the reproducing capability storing section 207 of the reproducing apparatus 210, and reading out the content from the directory. Needless to say, the reproducing apparatus 210 can reproduce a content in a directory corresponding to a capability table downwardly compatible with the capability table that is recorded in the reproducing capability storing section 207 of the reproducing apparatus 210, as well as the content in the directory corresponding to the capability table that is recorded in the reproducing capability storing section 207.

Note that, a recording apparatus that can handle only audio or sound, such as an IC recorder, cannot record an image, and thus cannot create a content for facsimile machine. Further, this recording apparatus can create a content for DVC, digital camera, and portable phone, but the created content is only sound or audio.

On the other hand, a recording apparatus that can handle only still image, such as a digital camera capable of shooting only still image, records only a still image content for DVC, facsimile machine, digital camera, and portable phone.

As described above, a content to be recorded on the memory card depends on all of (i) the type of input data, (ii) the capability of the recording apparatus, and (iii) the capability of the reproducing apparatus, which is registered on the memory card.

Here, if the memory card records a plurality of contents with respect to one input data, it is not necessary to create entirely different contents respectively for DVC and portable phone, for example, in an encoding system such as MPEG-2 and MPEG-4 which employs a hierarchical encoding system.

The memory card may record contents in such a manner that a content for DVC as a higher layer (high definition or high frame rate) is estimated based on a content for portable phone as a lower layer (low definition or low frame rate) so that the two contents are associated in a hierarchical structure. This achieves more efficient encoding compared with a case where two types of contents are separately recorded.

As described above, if the user has a plurality of reproducing apparatuses, a plurality of capable tables respectively corresponding to the plurality of reproducing apparatuses may be pre-registered or sequentially added to the memory card. With this, it is possible to automatically create a content that can be reproduced by each of the reproducing apparatuses without increasing workloads such as parameter setting in shooting and recording by the user.

The foregoing described the case where the input data that is originally shot, recorded, or created by the user is recorded on the memory card. Other than this case, the capability table can be effectively used in a case where a paid content distributed by a content distribution service is downloaded from a communications network and recorded on the memory card. In this case, it is possible to download a content after reading out information of a capability table recorded in the capability information management area 103 of the memory card 101 and confirming that a reproducing apparatus held by the user can reproduce the content to be distributed.

A type of content, an encoding system of content, and a reproducing capability that can be handled by a desired reproducing apparatus have been already registered on the memory card. Therefore it is possible to judge whether or not the desired reproducing apparatus can reproduce a content before downloading the content onto the memory card, without downloading the content to the memory card and inserting the memory card into the reproducing apparatus.

Namely, by utilizing information of the capability table of the reproducing apparatus, the user can be prevented from mistakenly downloading a content that cannot be reproduced by the reproducing apparatus held by the user and paying a needless fee.

First through Third Embodiments have described the examples where the capability table is pre-registered on the memory card using the reproducing apparatus, and in accordance with the capability table written onto the memory card, the recording apparatus sets the type, encoding system, encoding parameter, etc., of a content to be recorded on the memory card, so as to create the content reproducible by the reproducing apparatus.

The following will explain an example where the recording apparatus obtains from a source other than the memory card, information of the capability table corresponding to a desired reproducing apparatus, and records on the memory card, a content that can be reproduced by the desired reproducing apparatus.

It is assumed here that the recording apparatus 310 can connect to a network via the card slot 304 or other means. If the network is connected to a device such as a PC which stores capability tables of reproducing apparatuses, the control section 309 of the recording apparatus selects in accordance with instructions from the user (not shown), a capability table that corresponds to the desired reproducing apparatus from the plurality of capability tables on the PC. With this, the recording apparatus 310 acquires values in the selected capability table.

For example, it is assumed that a database of reproducing apparatuses is constructed on a PC, and the reproducing apparatus is a digital camera A. In this case, when the digital camera A is selected from the database, the PC transfers to the recording apparatus, a capability table corresponding to the digital camera A.

In accordance with the capability table, the recording apparatus sets the type, encoding system, encoding parameter, etc., of a content to be recorded on the memory card, and encodes the content. The recording apparatus then records the content to the content storage area 102 of the memory card 101, and records to the capability information management area 103 of the memory card 101, information of the capability table obtained via the network.

Namely, unlike in the foregoing embodiments, it is not necessary to register the capability information of the reproducing apparatus on the memory card before recording a content. Here, the capability table may be registered on the memory card at the same time the content is recorded on the memory card.

Another method is such that the recording apparatus 310 stores a list (not shown) of capability tables for reproducing apparatuses. In response to instructions from the user (not shown), the control section 309 of the recording apparatus 310 selects from the plurality of capability tables pre-recorded in the list, a capability table that corresponds to a desired reproducing apparatus.

In accordance with the selected capability table, the recording apparatus sets the type, encoding system, encoding parameter, etc., of a content to be recorded on the memory card, and encodes the content. The recording apparatus then records the content to the content storage area 102 of the memory card 101, and records to the capability information management area 103 of the memory card 101, information of the capability table that is input by the user or obtained through the network, etc.

Namely, unlike in the foregoing embodiments, it is not necessary to register the capability information of the reproducing apparatus on the memory card before recording a content. In other words, the capability table may be registered on the memory card at the same time the content is recorded on the memory card. With this, the reproducing apparatus does not need to perform the operation of registering the capability table on the memory card before recording a content, which was a necessary operation in the foregoing embodiments.

In the foregoing examples, it is possible to achieve the same effect as explained in First through Third Embodiments by registering when recording a content, the capability table of the reproducing apparatus in the capability information management area 103 of the memory card 101, even if the capability table of the reproducing apparatus has not been pre-registered in the capability information management area 103 of the memory card 101.

Fourth Embodiment

Figure 7:
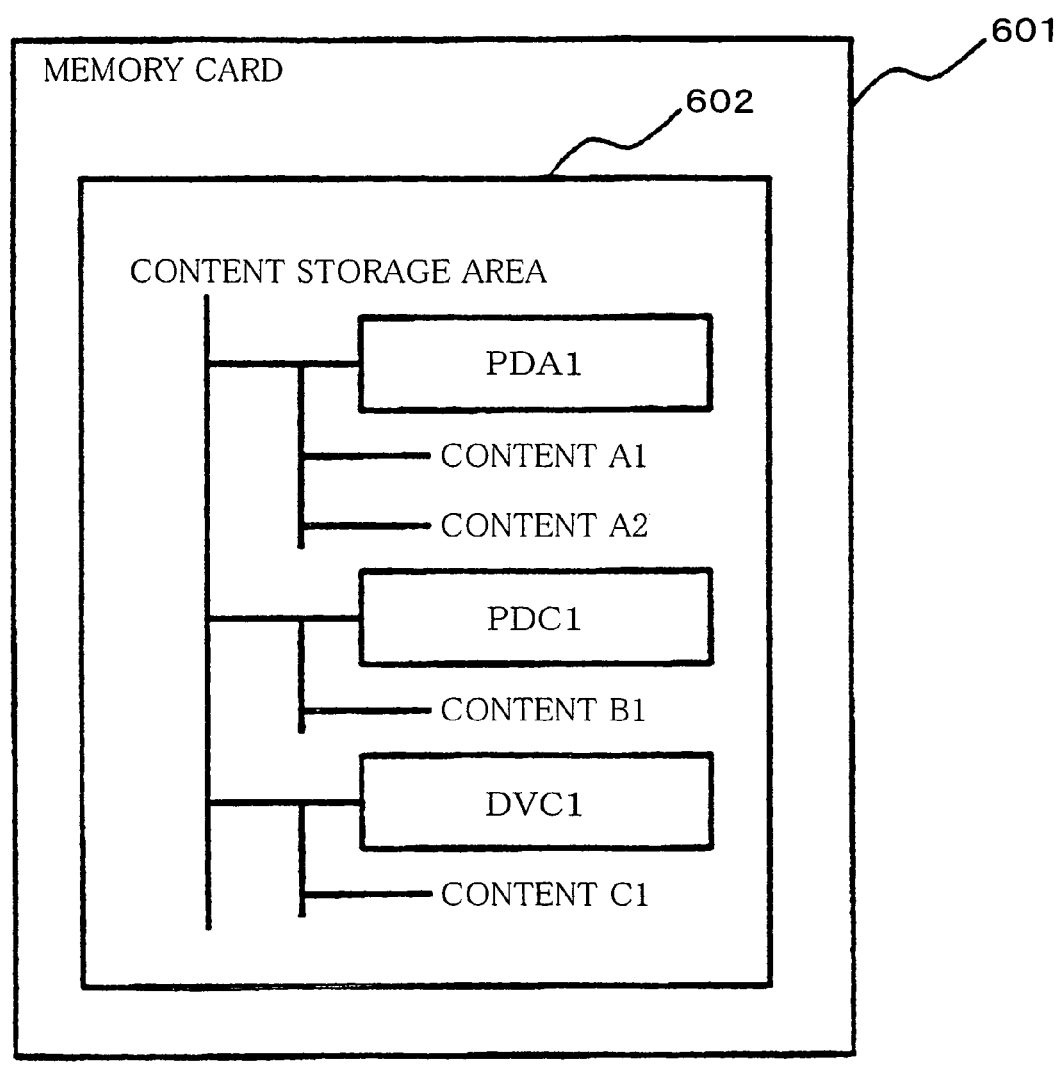
FIG. 7 is a diagram showing a memory card in accordance with an embodiment.

The following explains yet another embodiment. FIG. 7 shows a memory card used in Fourth Embodiment. A memory card 601 includes a content storage area 602 for storing encoded data (content) created by a recording apparatus.

The memory card 601 is inserted into a reproducing apparatus (such as PDA (Personal Digital Assistants), DVC, and PDC (Personal Digital Cellularsystem)). Then, an application program mounted on the reproducing apparatus automatically searches the content storage area 602 of the memory card 601. The application program searches the content storage area 602 for a directory that stores a content dedicated for the reproducing apparatus in question, and if such a directory is not found, creates the directory. On the other hand, if the directory is found, the application program of the reproducing apparatus searches the dedicated directory, and reads out a necessary file, namely, a file of a content that the recording apparatus has created for the reproducing apparatus in question.

For example, when the memory card is inserted into a PDA whose apparatus type is "PDA1", a directory called PDA1 is automatically created on the memory card if such a directory is not on the memory card. After this, a file that the recording apparatus created for PDA1 is sequentially placed in this directory. Thus, if the directory PDA1 is found on the memory card, this indicates that the memory card was inserted into PDA1.

In FIG. 7, PDA1, PDC1, and DVC1 are directory names; and content A1, content A2, content B1, and content C1 are file names of contents.

Hence, if a directory dedicated for a certain reproducing apparatus is found on the memory card as described above, it is possible to specify the reproducing apparatus to be used to reproduce a content that is stored in the memory card. If encoding parameters corresponding to a reproducing capability of a particular reproducing apparatus is pre-registered on the recording apparatus, the recording apparatus can create a content in accordance with the encoding parameters corresponding to the particular reproducing apparatus, and store the created content in the dedicated directory in the memory card. This means that the recording apparatus records on the memory card, a content that can be surely reproduced by the particular reproducing apparatus.

Figure 8:
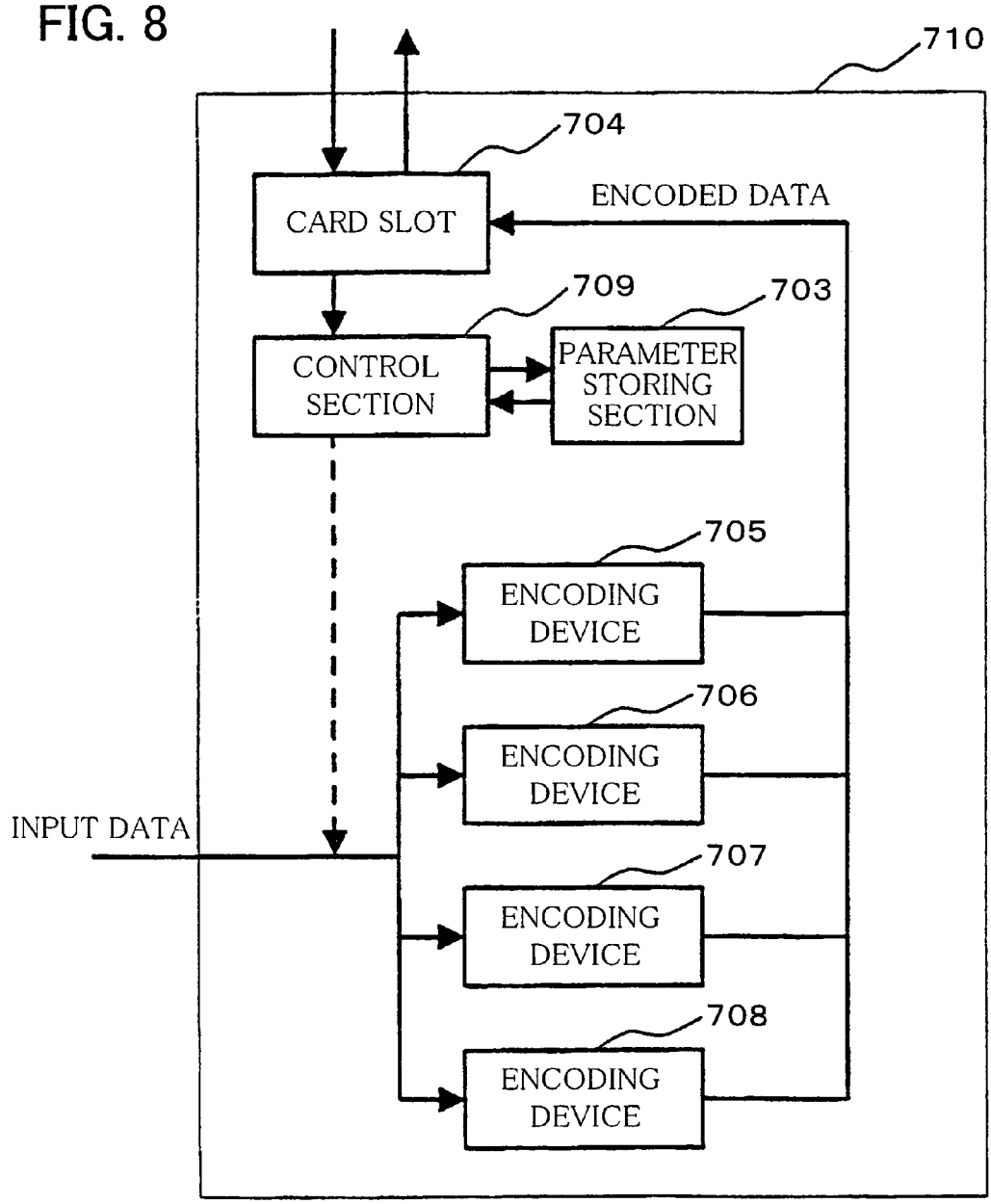
FIG. 8 is a block diagram showing an example of a recording apparatus in accordance with an embodiment.

The following will explain the operation of a recording apparatus shown in FIG. 8 in a case where the memory card 601 of FIG. 7 is used. The recording apparatus shown in FIG. 8 is arranged similarly to the recording apparatus of FIG. 4 as explained in First Embodiment except that the recording apparatus of FIG. 8 includes a parameter storing section 703, and has a control section 709 which operates differently from the control section 309 of FIG. 4. The control section 709 of the present embodiment finds from the content storage area 602 of the memory card 601, a directory name that is registered in the parameter storing section 703. In this case, the control section 709 finds the directory name PDA1.

Here, a directory name uniquely assigned to each reproducing apparatus, and information about a content reproducible by the each reproducing apparatus, as shown in Table 6, for example, are pre-registered in the parameter storing section 703.

TABLE 6

| DIRECTORY NAME | | | PDA1 | PDC1 | DVC1 | ... |
|---|---|---|---|---|---|---|
| NAME OF REPRODUCING APPARATUS | | | PDA | PORTABLE PHONE | CAMERA | ... |
| TYPE OF CONTENT | | | MOVING IMAGE, AUDIO | STILL IMAGE | MOVING IMAGE, STILL IMAGE, AUDIO | ... |
| ENCODING PARAMETER | MOVING IMAGE | SYSTEM | MPEG-4 | | MPEG-1 | ... |
| | | BIT RATE (kbps) | UP TO 384 | | UP TO 384 | ... |
| | | SIZE | UP TO 240 × 176 | | UP TO 320 × 240 | ... |
| | | FRAME RATE (fps) | 10 | | 6 | ... |
| | AUDIO | SYSTEM | G.726 | | MP3 | ... |
| | | SAMPLING FREQUENCY (kHz) | 8 | | 8 | ... |
| | | BIT RATE (kbps) | 32 | | 32 | ... |
| | STILL IMAGE | SYSTEM | | JPEG | JPEG2000 | ... |
| | | PIXEL SAMPLING | | 4:2:0 | 4:2:0 | ... |
| | | SIZE | | UP TO 320 × 240 | UP TO 640 × 480 | ... |
| ... | ... | ... | ... | ... | ... | |

From the parameter storing section 703, the control section 709 reads out information corresponding to the directory name PDA1, as shown in Table 6. In accordance with the read out information, the control section 709 selects one of encoding devices 705 through 708 (respectively for different contents or in different systems), and controls the encoding of input data based on the parameters shown in Table 6.

First, in accordance with entries in the table read out from the parameter storing section 703, the control section 709 of the recording apparatus 710 recognizes that the reproducing apparatus is PDA1, the contents are moving images and audio, and the encoding systems for the moving images and audio are MPEG-4 and G. 726, respectively.

Next, the control section 709 selects an MPEG-4 encoding device (assumed as 705 here) and a G. 726 encoding device (assumed as 706 here), and supplies the input data to the encoding devices 705 and 706.

Here, as the MPEG-4 encoding parameters, the size of 176×144, the bit rate of 192 kbps, and the frame rate of 10 fps are selected from the MPEG-4 parameters shown in Table 6. If an encoding parameter in the capability table is in a selectable range, a default value pre-set in the recording apparatus 710 may be used if the default value falls within the capability of the encoding devices. Alternatively, selected may be a maximum value that satisfies both the values in the capability table and the capability values of the encoding devices; a value corresponding to the format of the input data; or a value designated by the user.

As the G. 726 encoding parameters, the sampling frequency of 8 kHz and the bit rate of 16 kbps, both of which are recorded in the table, are used. The thus encoded data (content) of the moving image (MPEG-4) and the sound (G. 726) is recorded in the directory PDA1 in the content storage area 602 of the memory card 601.

As explained above, in Fourth Embodiment, a directory uniquely assigned to a reproducing apparatus 210 is created on the memory card 601, and then the recording apparatus 710 automatically creates a content that meets the processing capability of the reproducing apparatus 210. With this, the reproducing apparatus 210 can surely reproduce the content recorded on the memory card 601.

Further, unlike in First through Third Embodiments, the recording apparatus learns encoding parameters based on the directory name that a conventional reproducing apparatus has been already using. Thus, a conventional reproducing apparatus as shown in FIG. 2, which is not provided with the reproducing capability storing section 207, for example, may be used here as the reproducing apparatus.

Note that, in First through Third Embodiments as described earlier, the directory name uniquely assigned to a reproducing apparatus is used to recognize the reproducing apparatus that uses the memory card and know the reproducing capability of the reproducing apparatus. But, instead of the directory name, a file name uniquely assigned to a reproducing apparatus may be used to recognize the reproducing apparatus and know the reproducing capability of the reproducing apparatus. For example, a content whose file name contains an apparatus name PDA1, such as PDA1_1. mp4, can be recognized as being created by PDA1.

Further, if a plurality of reproducing apparatuses write dedicated directories on a memory card, a plurality of dedicated directories are created on the memory. The recording apparatus may select one of the directories either by default or by instructions from the user, and writes a content only into the selected directory. Another example is that contents are created using encoding parameters respectively corresponding to the reproducing apparatuses and respectively written into all of the directories. Further, a content may be written into only a directory for the reproducing apparatus corresponding to the encoding parameters that can be employed by the recording apparatus.

The list of Table 6 registers PDA, portable phone, and camera respectively in one type, but may register a reproducing apparatus in multiple types, such as PDA1, PDA2, . . . , PDC1, PDC2, . . . , and DVC1, DVC2, . . . .

Further, when a reproducing apparatus whose unique directory name is not pre-registered in the list of Table 6 is found, the user can newly register in the list, the directory name, the reproducing apparatus, and information indicating the reproducing capability of the reproducing apparatus.

Fifth Embodiment

Figure 9:
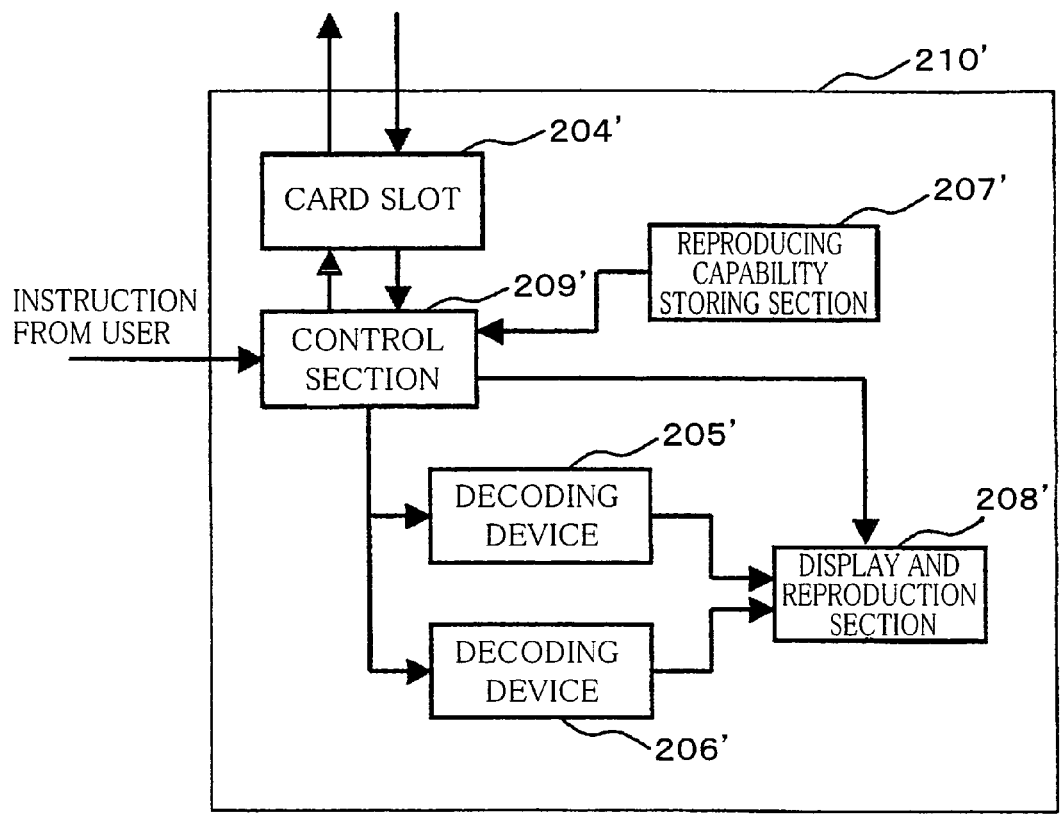
FIG. 9 is a block diagram showing an arrangement of a content reproducing apparatus in accordance with an embodiment.

FIG. 9 is a block diagram showing an arrangement of a content reproducing apparatus in accordance with Fifth Embodiment.

FIG. 9 shows a card slot 204', decoding devices 205' and 206' (respectively for different contents or in different systems) built in a content reproducing apparatus 210', a reproducing capability storing section 207' for storing information (capability information) about a content reproducing capability of the content reproducing apparatus 210', a control section 209' for recording capability information on a memory card and managing a content, and a display and reproduction section 208' for reproducing and displaying a content reproduced by the decoding devices 205' and 206'.

Note that, Embodiment 5 shown in FIG. 9 uses two types of decoding devices 205' and 206', but the content reproducing apparatus 210' may include one type of decoding device or three or more types of decoding devices.

The following will concretely explain the capability information about the content reproducing capability of the content reproducing apparatus 210'.

Table 7 shows an example of entries recorded in the capability information, and includes items such as the name and type name of the content reproducing apparatus, the type of reproducible content (such as audio, sound, still image, moving image, and text), the reproducing capability (such as encoding system, size, bit rate, and sampling frequency). This information is managed as a capability table which records in table form, setting values corresponding to each of the items, as shown in Table 8, for example.

The capability table may record the profile, level (such as MP@ML), or mode as mentioned earlier, instead of recording the reproducing capability such as encoding system and size as shown in Table 8.

TABLE 7

ENTRIES RECORDED IN CAPABILITY TABLE

| | | | |
|---|---|---|---|
| TYPE OF REPRODUCING APPARATUS | | | DVC, DIGITAL CAMERA, TV, PC |
| NAME OF REPRODUCING APPARATUS | | | |
| TYPE OF CONTENT | | | AUDIO, MOVING IMAGE, STILL IMAGE, SOUND, TEXT |
| REPRODUCING CAPABILITY | AUDIO | ENCODING SYSTEM SAMPLING FREQUENCY BIT RATE | AAC/MP3/WMA/G.726/WAVE |
| | MOVING IMAGE | ENCODING SYSTEM BIT RATE FRAME RATE SIZE PROFILE AND LEVEL | MPEG-4/MPEG-2/Motion-JPEG |
| | STILL IMAGE | ENCODING SYSTEM SIZE PIXEL SAMPLING | JPEG(Exif)/BMP/GIF/PNG 4:2:0/4:2:2/4:4:4 |
| | SOUND | ENCODING SYSTEM SAMPLING FREQUENCY BIT RATE | G.726/AMR |
| | TEXT | | |

TABLE 8

EXAMPLE OF CAPABILITY TABLE

| | | | |
|---|---|---|---|
| TYPE OF REPRODUCING APPARATUS | | | PORTABLE TERMINAL |
| NAME OF REPRODUCING APPARATUS | | | VIDEO PLAYER |
| TYPE OF CONTENT | | | MOVING IMAGE, SOUND |
| REPRODUCING CAPABILITY | MOVING IMAGE | ENCODING SYSTEM PROFILE AND LEVEL | MPEG-4 Simple Profile Level3 |
| | | SIZE | 352 × 288, 176 × 144 |
| | | BIT RATE | 384 kbps |
| | | FRAME RATE | 30 fps |
| | | PIXEL SAMPLING | 4:2:0 |
| | SOUND | ENCODING SYSTEM | G.726 |
| | | SAMPLING FREQUENCY | 8 kHz |
| | | BIT RATE | 16 kbps |

The following explanation assumes that the content reproducing apparatus 210' is a portable terminal in accordance with the capability table shown in Table 8. In this case, 205' is a MPEG-4 decoding device, and 206' is a G. 726 decoding device.

Figure 10:
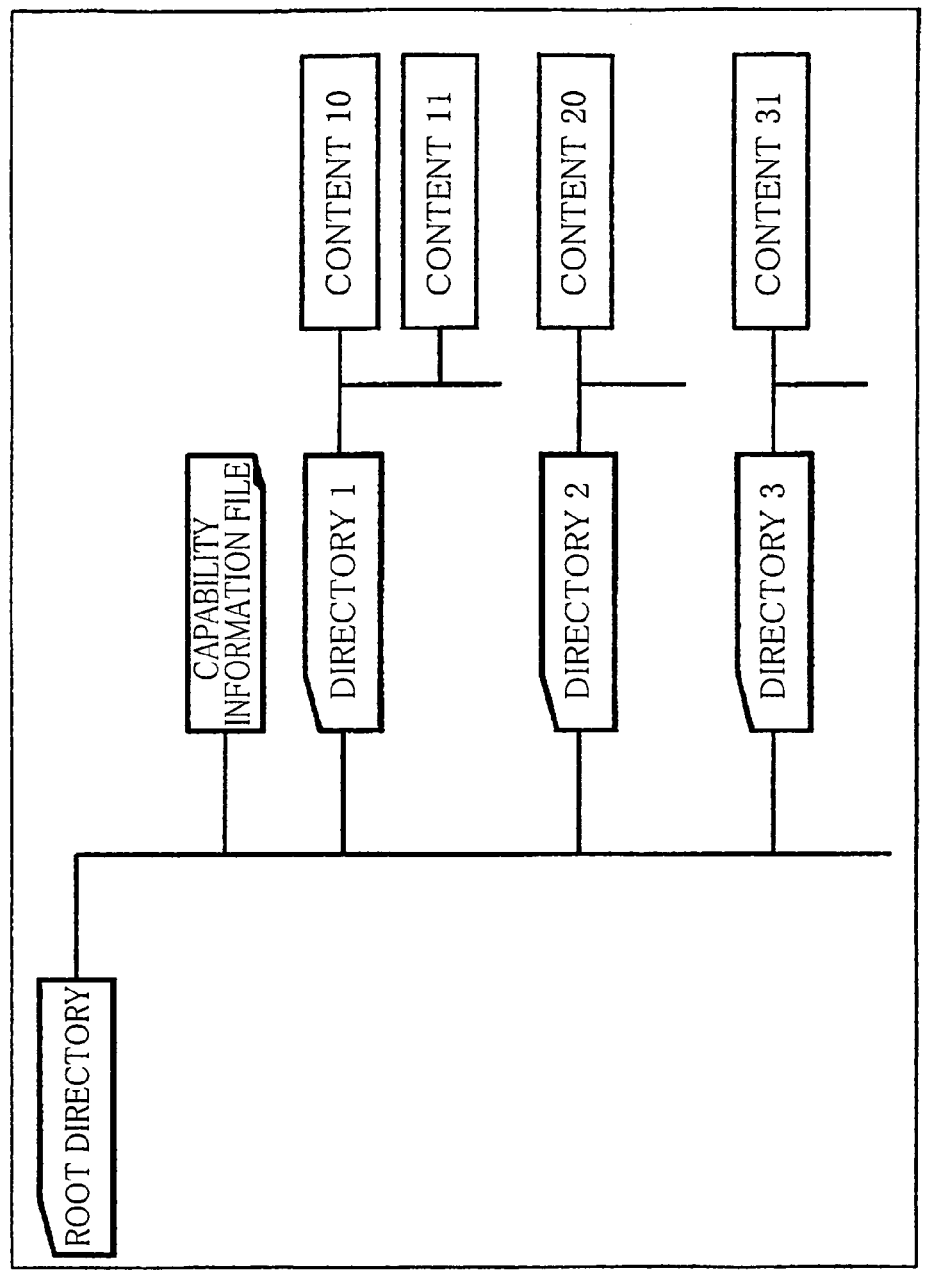
FIG. 10 is a diagram schematically showing an example of file management information (directory information) on the memory card.

The control section 209' manages as file management information in a unified manner, a content and capability information recorded on the memory card. FIG. 10 shows an example of the file management information (directory information) on the memory card.

As shown in FIG. 10, the file management information has a tree structure of directories, and is composed of a capability information file which records the capability table of the content reproducing apparatus 210', and one or more directories for content storage. Contents are classified according to creation dates, for example, and stored in the respective directories. The control section 209' reads out the capability table from the reproducing capability storing section 207' and writes the capability table onto the memory card when the memory card is inserted into the content reproducing apparatus 210'.

This operation will be explained as follows.

Figure 11:
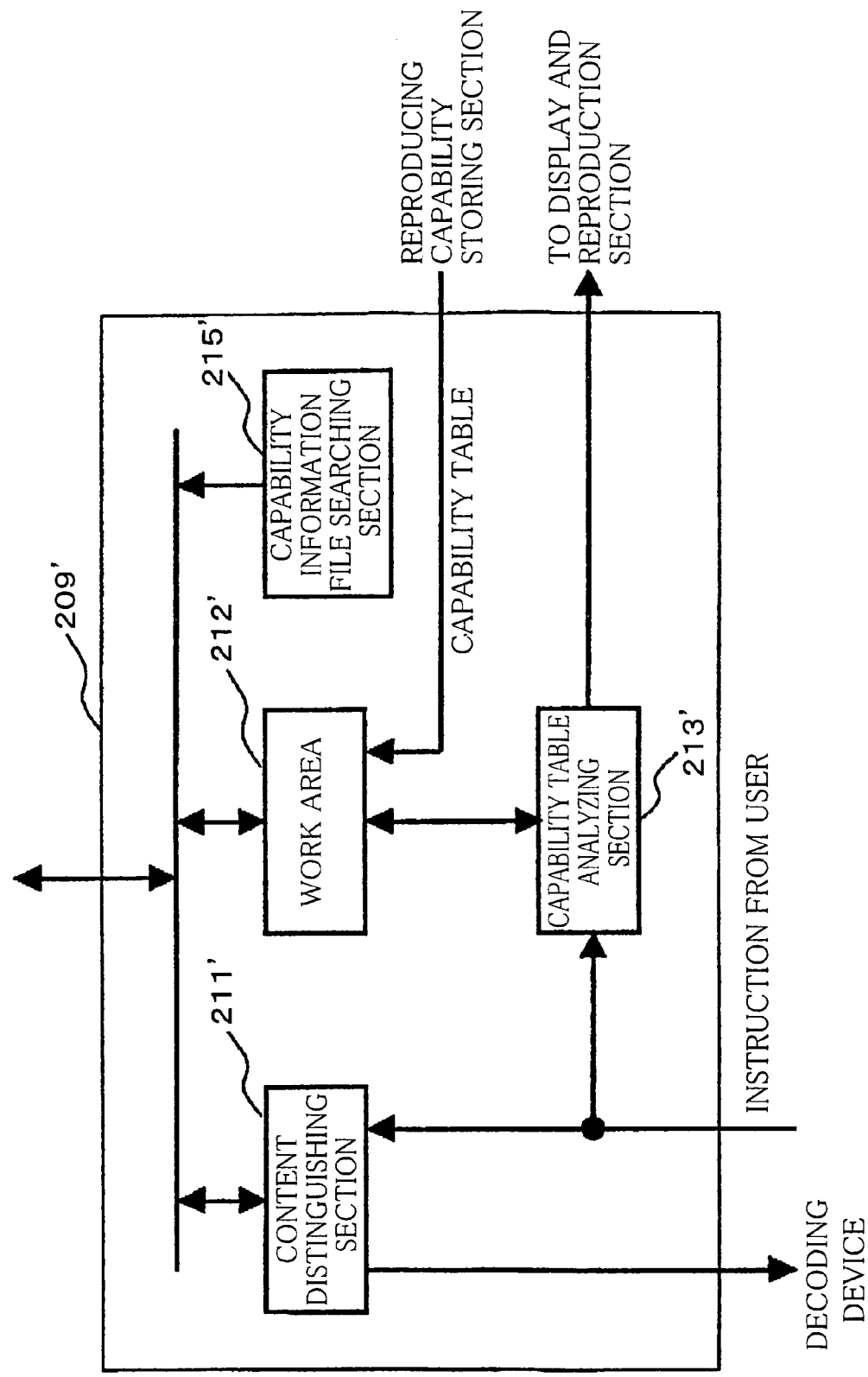
FIG. 11 is a block diagram showing an arrangement of a control section of the content reproducing apparatus in detail.

FIG. 11 is a block diagram showing an arrangement of the control section 209' in detail.

As shown in FIG. 11, the control section 209' is composed of a content distinguishing section 211', a work area 212', a capability table analyzing section 213', and a capability information file searching section 215'.

When a memory card is inserted into the card slot 204', the control section 209' accesses the memory card, and the capability information file searching section 215' searches for the capability information file on the memory card. If the capability information file is not found on the memory card, the control section 209' newly creates a capability information file, and then the control section 209' reads out the capability information table from the reproducing capability storing section 207' and records the capability information table into the created capability information file.

If an item of the capability table has a plurality of setting values from which the user can select, the control section 209' may record either all of or part of the setting values. In order to record a part of the setting values, the control section 209' reads out the capability table to the work area 212', and displays the selectable setting values on the display and reproduction section 208'. The capability table analyzing section 213' records to the capability information file from the capability table in the work area 212', only setting values selected in accordance with instructions from the user.

On the other hand, if the memory card already has the capability information file, the control section 209' reads out from the capability information file, the capability table (first capability table) to the work area 212' in the control section 209'. Further, the control section 209' reads out the capability table (second capability table) to the work area 212' from the reproducing capability storing section 207'. The capability table analyzing section 213' reads out items in the first and second capability tables which are read out to the work area 212', and compares setting values of the items. In this example, the capability table shown in FIG. 8 is registered on the memory card, and the content reproducing apparatus 210' has the capability table shown in Table 8. Namely, the two capability tables are identical with each other. This eliminates the need for updating the capability information file, so that the control section 209' discards the capability tables in the work area 212'.

Figure 12:
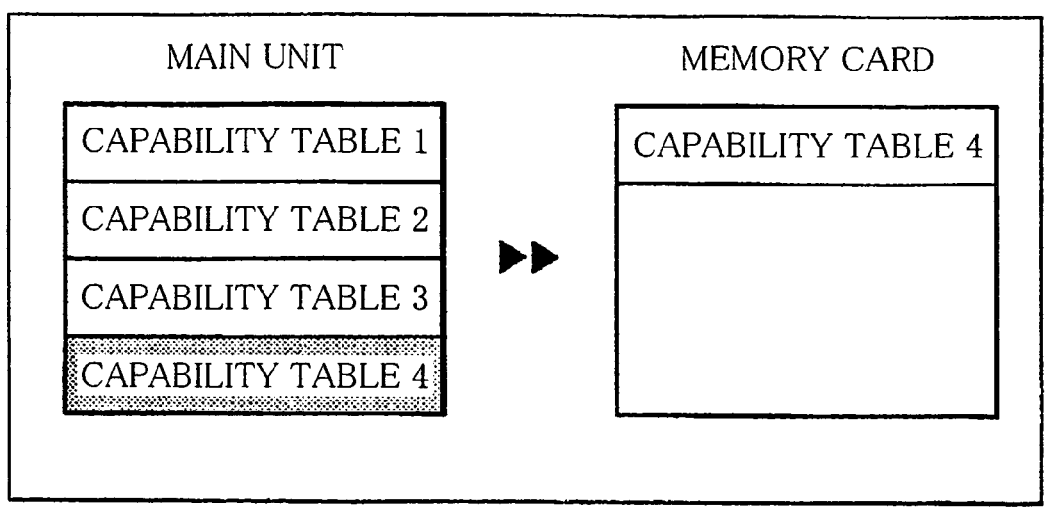
FIG. 12 is a diagram schematically showing an example a list display of capability tables.

Further, the content reproducing apparatus 210' may have a plurality of capability tables other than the capability information file shown in Table 8. In this case, the control section 209' may cause the display and reproduction section 208' to display the plurality of selectable capability tables, and records to the capability information file, only capability tables selected in accordance with instructions from the user. FIG. 12 shows an example of a list of capability tables displayed on the content reproducing apparatus 210'. Note that, FIG. 12 shows a case where the capability table 4 is selected.

If a plurality of capability tables are selected here, the control section 209' sorts the selected capability tables in order of preference designated by instructions from the user, and records the capability tables to the capability information file. Further, in a case where the memory card already has the capability information file, the control section 209' adds the second capability table to the first capability table recorded in the capability information file if the first and second capability tables indicate the same type or name of reproducing apparatus but have different entries from each other.

Note that, the foregoing described the case where the memory card records one capability information file, but the memory card may record a plurality of capability information files if all of the capability information files indicate the same reproducing apparatus. In this case, a directory tree containing the capability information file (root directory in FIG. 10) includes the plurality of capability information files.

Further, the capability tables thus recorded in the capability information file can be distinguished from one another by the capability table analyzing section 213', and can be deleted individually. Further, if there are a plurality of capability information files, the capability information files may be deleted individually.

Further, the capability table may be recorded on the memory card in such a manner that the user copies to the capability information file, information of the capability table pre-stored in a PC, etc., for example; or the user directly inputs the entries shown in Table 8 into the capability information file by use of a PC.

Further, if the content reproducing apparatus 210' reformats the memory card, the content reproducing apparatus 210' may create a capability information file in a manner similar to a case when the memory card is first inserted into the card slot 204', after, erasing all of the capability information file and contents on the memory card.

The following will explain a method for recording a content on the memory card which has recorded the entries shown in Table 8.

Figure 13:
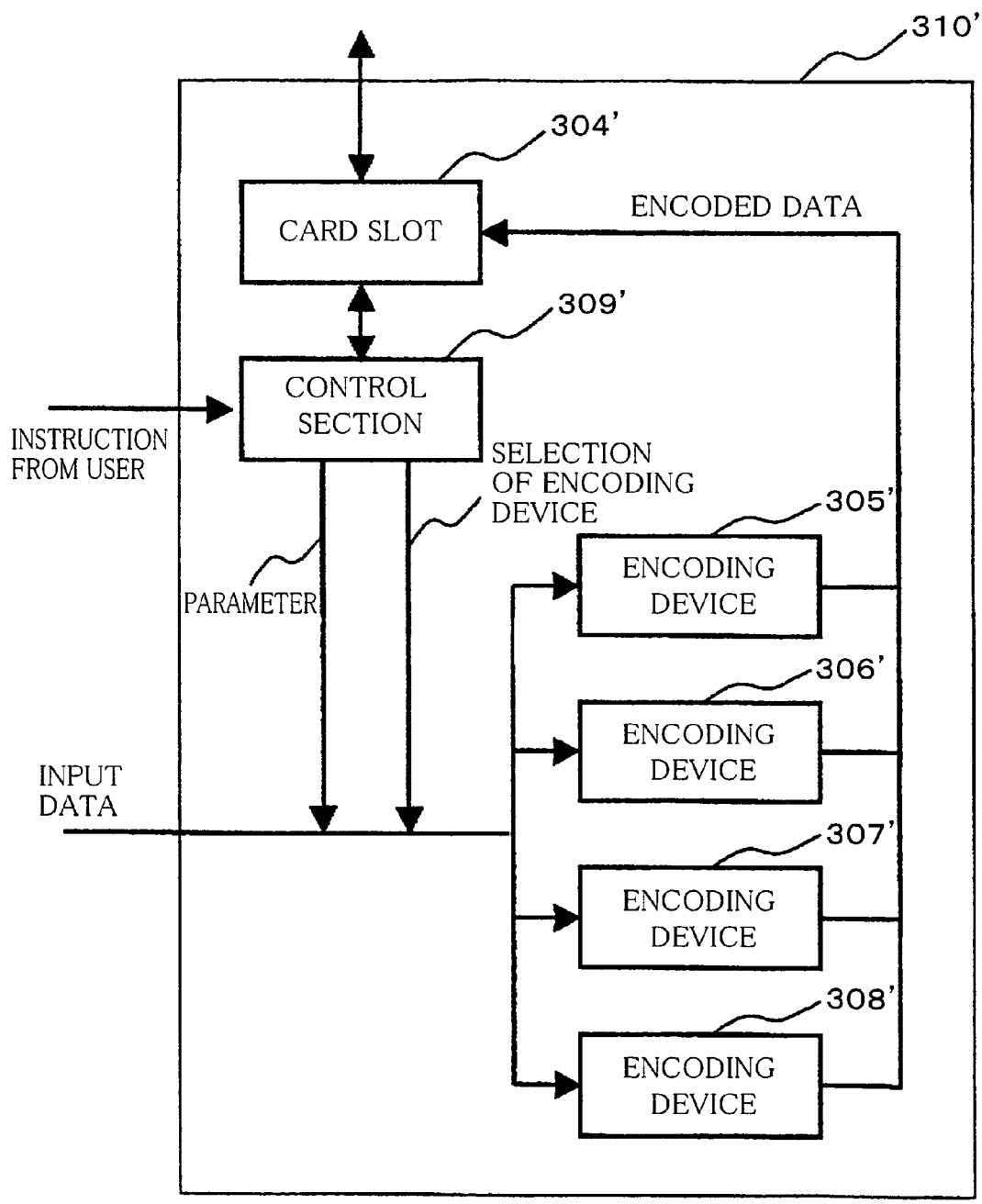
FIG. 13 is a block diagram showing an arrangement of a content recording apparatus.

FIG. 13 is a block diagram showing an arrangement of a content recording apparatus 310' of Embodiment 5 for creating a content (encoded data) by encoding input data.

FIG. 13 shows a card slot 304', encoding devices 305' through 308' (respectively for different contents or in different systems) built in the content recording apparatus 310', and a control section 309' for reading out capability information from the memory card and recording a content on the memory card.

The content recording apparatus 310' reads out information of the capability table from the capability information file on the memory card, selects one of the encoding devices (305' through 308') that has a system in accordance with the capability table, encodes input data in accordance with the capability table, and records a content (encoded data) on the memory card via the card slot 304'.

Note that, Embodiment 5 shown in FIG. 13 shows four types of encoding devices 305' through 308', but the content recording apparatus 310' may include either three or less encoding devices or five or more encoding devices.

Figure 14:
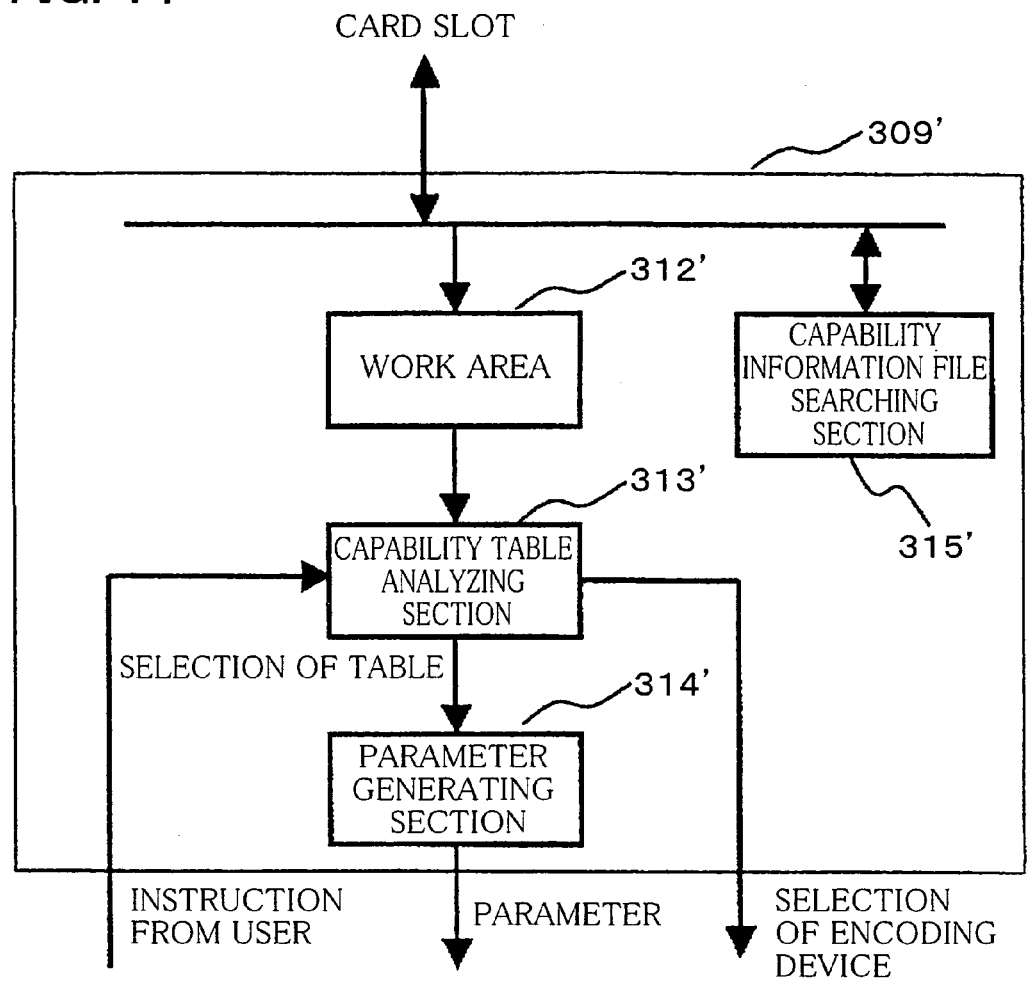
FIG. 14 is a block diagram showing an arrangement of a control section of the content recording apparatus in detail.

Next, the operation of the control section 309' will be explained with reference to FIG. 14. FIG. 14 is a block diagram showing the control section 309' in detail.

The control section 309' is composed of a work area 312', a capability table analyzing section 313', a parameter generating section 314', and a capability information file searching section 315'. Note that, the following explanation will assume that, in FIG. 13, the content recording apparatus 310' is a DVC, the encoding device 305' is an MPEG-4 encoding device, the encoding device 306' is a G. 726 encoding device, the encoding device 307' is an AAC encoding device, and the encoding device 308' is a JPEG (Exif) encoding device.

First, the control section 309' accesses the memory card, and the capability information file searching section 315' searches for the capability information file on the memory card in accordance with management information pre-recorded on the memory card. Based on entries recorded in a capability table read out from the thus found capability information file, the capability table analyzing section 313' recognizes that the content reproducing apparatus 210' is a portable terminal, the contents are moving image and sound, and the encoding systems for the moving image and sound are MPEG-4 and G. 726, respectively.

Here, as the MPEG-4 encoding parameters, a size that can be used by the content recording apparatus 310' is selected from the range of from 176×144 to 352×288 that is recorded in the capability table of Table 8, and a bit rate and a frame rate are selected from respective ranges usable by the content recording apparatus 310'. If a capability value in the capability table is in a usable range like this, a value used may be either a default value pre-set in the content recording apparatus (DVC) 310', a maximum value that satisfies both the values in the capability table and the capability values of the content recording apparatus (DVC) 310'; a value corresponding to the format of the input data; or a value designated by the user. As the G. 726 encoding parameters, the sampling frequency of 8 kHz and the bit rate of 16 kbps, both of which are recorded in the capability table, are used.

Here, in the content recording apparatus (DVC) 310', the encoding device 305' complies with MPEG-4, the encoding device 306' complies with G. 726, the encoding device 307' complies with AAC, and the encoding device 308' complies with JPEG (Exif). Thus, in order to encode input data (in this case, one frame of moving image data, and sound data), the capability table analyzing section 313' selects the encoding device 305' complying with MPEG-4 and the encoding device 306' complying with G. 726, and supplies the input data to the encoding devices 305' and 306'.

The parameter generating 314' generates in accordance with setting values described in the capability table, control parameters for controlling the encoding devices 305' and 306', and supplies the control parameters to the encoding devices 305' and 306'. The encoded data (content) of the moving image and sound encoded in this manner (MPEG-4 and G. 726) are recorded in the directory 1 (see FIG. 10) on the memory card, for example.

Figure 15:
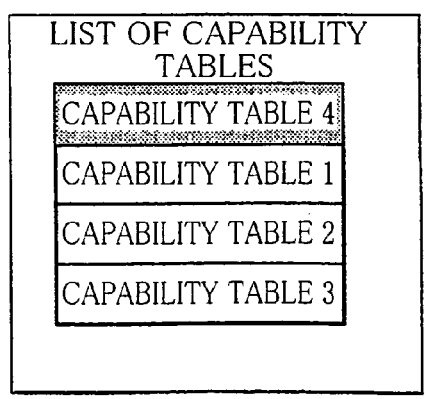
FIG. 15 is a diagram schematically showing an example of a list display of capability tables.

If one capability information file records a plurality of capability tables, the control section 309' reads out all of the capability tables to the work area 312' in the control section 309'. The capability table analyzing section 313' analyzes the capability tables that are read out to the work area 312', and displays on a display section (not shown), a list of the capability tables. FIG. 15 shows an example of the list displayed here. FIG. 15 shows a case where the capability table 4 is selected. The capability tables are recorded in order of preference. Thus, when the capability tables are displayed in the same order starting from the capability table recorded first in the order, the capability tables can be displayed in order of preference. The capability table analyzing section 313' reads out from the work area 312', a capability table selected in accordance with instructions from the user. Note that, the capability table analyzing section 313' may select a capability table recorded first in the order in the capability information file, so as to read out the high-priority capability table.

Further, if the capability table analyzing section 313' judges that the selected capability table is not usable because the recording apparatus 310' does not comply with the selected capability table or other reason, the control section 309' reads out to the work area 312', a capability table either next selected by the user or next preferred. Here, the capability table judged as unusable may be entirely replaced with the newly read out capability table. Alternatively, setting values of items judged as unusable in the capability table may be replaced with setting values of the items in the newly read out capability table. If there is no usable capability table, the display section (not shown) shows an error display, but the content recording apparatus may select closest setting values from selectable encoding devices and encode the input data.

The following will explain a case where the content reproducing apparatus 210' shown in FIG. 9 reproduces the content that is recorded on the memory card as described above.

In the content reproducing apparatus (portable terminal) 210', the control section 209' reads out from contents recorded on the memory card, a content designated in accordance with instructions from the user. Then, the decoding device 205' and the decoding device 206' decode encoded moving image data and encoded sound data, respectively, and output the decoded data to the display and reproduction section 208'. Here, the user may designate the content by selecting from a list or thumbnails of the contents recorded on the memory card when the list or thumbnails are displayed on the display and reproduction section 208'.

The capability table recorded on the memory card and used by the content recording apparatus 310' in encoding and recording the content indicates capability values of the content reproducing apparatus 210' which are written by the reproducing capability storing section 207' when the memory card is inserted into the content reproducing apparatus 210'. The content recorded on the memory card is therefore encoded and recorded within a type reproducible by the content reproducing apparatus 210' and within a processing capability of the content reproducing apparatus 210'. Hence, the content recorded on the memory card can be reproduced by the content reproducing apparatus 210' without problems.

Table 9 shows a capability table of a general-purpose portable terminal having a moving image reproducing function. This compatibility table is inferior to the capability table of the dedicated terminal shown in Table 8 in terms of the bit rate and frame rate of reproducible moving image. If the user holding such a general-purpose terminal uses the content recording apparatus (DVC) 310' as described earlier to record a content, it is possible to automatically create a content within the processing capability of the content reproducing apparatus 210' by using the method as described above.

TABLE 9

| TYPE OF REPRODUCING APPARATUS | | | PORTABLE TERMINAL |
|---|---|---|---|
| NAME OF REPRODUCING APPARATUS | | | PDA-1 |
| TYPE OF CONTENT | | | MOVING IMAGE, SOUND |
| REPRODUCING CAPABILITY | MOVING IMAGE | ENCODING SYSTEM | MPEG-4 |
| | | PROFILE AND LEVEL | Simple Profile Level1 |
| | | SIZE | 176 × 144 |
| | | BIT RATE | 64 kbps |
| | | FRAME RATE | 15 fps |
| | | PIXEL SAMPLING | 4:2:0 |
| | SOUND | ENCODING SYSTEM | G.726 |
| | | SAMPLING FREQUENCY | 8 kHz |
| | | BIT RATE | 16 kbps |

As described above, the memory card pre-records the processing capability information (such as a type of content, an encoding system of content, and a processing capability value that allow reproduction) of the content reproducing apparatus 210', and the content recording apparatus 310' automatically creates a content that meets the processing capability information. With this, it is possible to record on the memory card, a content that can be surely reproduced by the content reproducing apparatus 210' without requiring the user to perform any complicated setting.

Sixth Embodiment

The following will explain Sixth Embodiment of a content recording/reproducing system, content reproducing apparatus, content recording apparatus, and content re-coding apparatus.

Sixth Embodiment will explain the operation in which the user switches from a content reproducing apparatus (A) to another content reproducing apparatus (B) in a case where the user holds two portable phones respectively having different capabilities in accordance with usage, or the user holds a plurality of content reproducing apparatuses such as TV, PC, DVC, digital camera, portable phone, and car audio system.

Here, the management information recorded on the memory card is as shown in FIG. 10, and the content reproducing apparatus (B) is arranged as shown in FIGS. 9 and 11.

When the memory card is inserted into the card slot 204', the control section 209' accesses the memory card, and, in accordance with management information pre-recorded on the memory card, the capability information file searching section 215' searches for the capability information file in the directories. A case where the memory card already has the capability information file corresponding to the content reproducing apparatus in question is the same as in Fifth Embodiment, thus their explanation is omitted here.

On the other hand, if the memory card does not have the capability information file corresponding to the content reproducing apparatus in question, the control section 209' updates the management information. More specifically, the control section 209' creates a directory for the content reproducing apparatus (A) on the memory card, and transfers the capability information file and the content to the directory. Further, the control section 209' creates a directory for the content reproducing apparatus (B) and creates a capability information file in the directory for the content reproducing apparatus (B).

Figure 16:
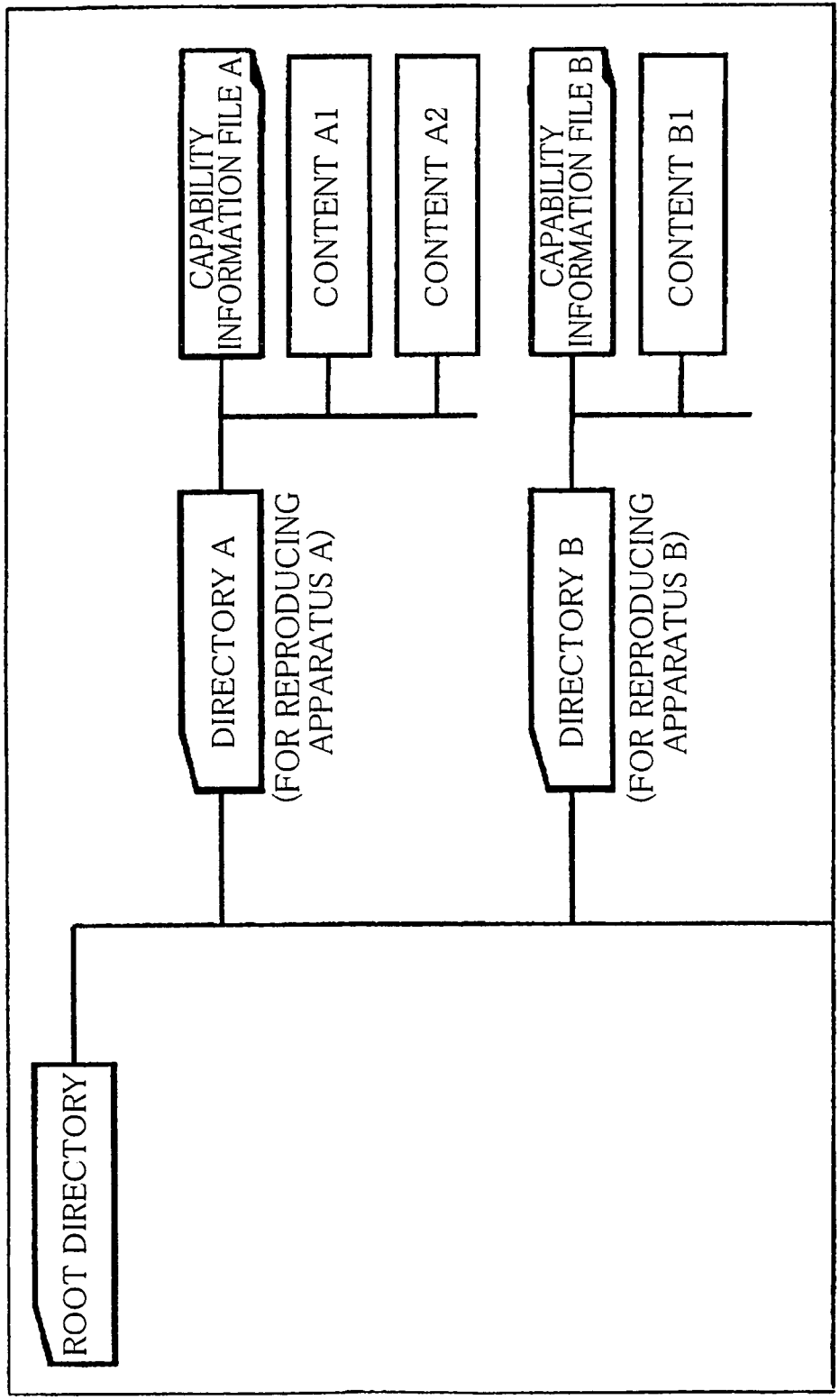
FIG. 16 is a diagram schematically showing a directory structure of the management information.

FIG. 16 shows a directory structure in the management information here. As shown in FIG. 16, on the memory card, directories respectively for the content reproducing apparatus (A) and the content reproducing apparatus (B) are created, and two types of capability information files are respectively stored. In this manner, if each content reproducing apparatus has at least one capability information file, the capability information file and a content are recorded in the same directory.

Next, the following will explain the operation of the content recording apparatus 310' for recording a moving image content on the memory card.

First, the control section 309' of the content recording apparatus 310' accesses the memory card and, in accordance with management information pre-recorded on the memory card, the capability information file searching section 315' searches for the capability information file in the directories. When a plurality of capability information files are obtained as a result of the searching, the capability table analyzing section 313' reads out the types and names of reproducing apparatuses from capability tables whose type of content is moving image.

Figure 17:
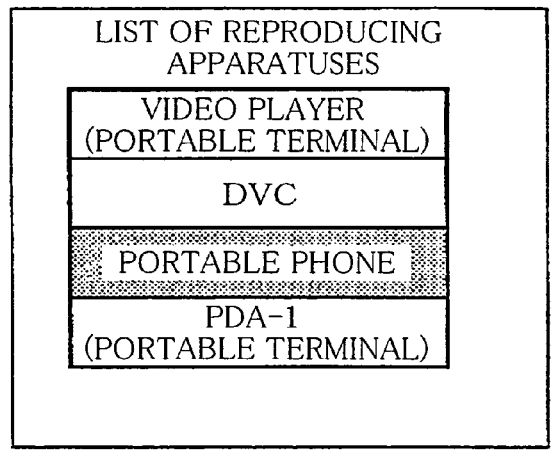
FIG. 17 is a diagram schematically showing an example of display of types of content reproducing apparatuses.

The control section 309' displays on a display section (not shown), a list of the read out types of content reproducing apparatuses 210'. If there are a plurality of reproducing apparatuses in the same type, a list of the names of the reproducing apparatuses are also displayed. FIG. 17 shows an example of the list displayed here. In the example shown in FIG. 17, the apparatus names are displayed for portable terminals, and the apparatus types are displayed for the other apparatuses. Note that, FIG. 17 shows a case where the portable phone is selected.

The control section 309' reads out a capability table from a capability information file corresponding to the content reproducing apparatus 210' designated in accordance with instructions from the user. Alternatively, without displaying the list to the user, the control section 309' selects one of the plurality of capability information files by selecting the most recently dated one of the capability information files, for example. Here, a capability information file (B) corresponding to the content reproducing apparatus (B) is selected. Note that, the operation of reading out the capability table from the selected capability information file and recording the moving image content is the same as in Fifth Embodiment, thus their explanation is omitted here. Here, the content recorded in accordance with the capability information file (B) is written in a directory (B).

The following will explain the operation in which the content reproducing apparatus 210' shown in FIG. 9 reproduces the content that is recorded on the memory card as described above.

First, the control section 209' accesses the memory card, and, in accordance with management information pre-recorded on the memory card, the capability information file searching section 215' searches for the capability information file in the directories. When the capability information file is obtained as a result of the searching, a capability table (first capability table) is read out from the capability information file to the work area 212' in the control section 209'. Further, a capability table (second capability table) is read out from the reproducing capability storing section 207' to the work area 212'.

The capability table analyzing section 213' reads out items in the first and second capability table which are read out to the work area 212', and compares setting values of the items so as to judge whether or not the first capability table corresponds to the content reproducing apparatus 210' in question. If the capability information file corresponding to the content reproducing apparatus 210' in question is detected in this manner, the content reproducing apparatus 210' reproduces a content stored in a directory containing the capability information file, in accordance with the pre-recorded management information. The operation of reproducing the content selected by the user is the same as in Fifth Embodiment, thus their explanation is omitted here.

Note that, the foregoing described the case where there are a plurality of reproducing apparatuses respectively having different capabilities, but the directory structure shown in FIG. 16 may be applied to a case where there are a plurality of capability information files respectively recording different capability tables with respect to one reproducing apparatus.

As described above, even if there are a plurality of content reproducing apparatuses 210', the memory card pre-records processing capability information (such as a type of content, an encoding system of content, and processing capability values that allow reproduction) of the content reproducing apparatus, and the content recording apparatus 310' automatically creates a content that meets the processing capability information. With this, it is possible to record on the memory card, a content that can be surely reproduced by each of the content reproducing apparatuses without requiring the user to perform any complicated setting.

Seventh Embodiment

The following will explain Seventh Embodiment of a content recording/reproducing system, content reproducing apparatus, content recording apparatus, and content re-coding apparatus.

In Fifth Embodiment as described earlier, the input data is image data, sound data, or other data picked up from a CCD or microphone. Seventh Embodiment will explain a case where a content that has been already encoded is re-coded in consideration of encoding parameters so that the content reproducing apparatus can reproduce the content.

Note that, for simplicity, it is assumed in Seventh Embodiment that the type of the content is only moving image, and encoding parameters only for the moving image will be explained. Table 10 shows an example of compatibility modes of an SD memory card.

TABLE 10

EXAMPLE OF COMPATIBILITY MODES

| MODE | IMAGE SIZE | FRAME RATE | BIT RATE |
|---|---|---|---|
| C4 | CIF | 15 fps | 384 kbps |
| C3 | 1/2QVGA | 15 fps | 384 kbps |
| C2 | QCIF | 15 fps | 384 kbps |
| C1 | QCIF | 15 fps | 64 kbps |

The encoding system in the example shown in Table 10 is MPEG-4, but is divided into four modes depending on the processing capability of the reproducing apparatus. A content reproducing apparatus supporting the highest mode C4 is capable of reproducing at a frame rate of 15 fps (frame/second), a CIF size image encoded at a bit rate of 384 kbps. On the other hand, a content reproducing apparatus supporting only the lowest mode C1 is only capable of reproducing at a frame rate of 15 fps, a QCIF size image encoded at a bit rate of 64 kbps.

Therefore a content reproducing apparatus supporting C4 can reproduce a content created by a content recording apparatus supporting any of the modes C1 through C4. In contrast, a content reproducing apparatus supporting only C1 cannot properly reproduce a content corresponding to C4 due to the occurrence of frame missing or the discontinuing of reproduction, etc., because the content exceeds the processing capability of the content reproducing apparatus. In other words, in order to allow a content reproducing apparatus supporting only C1 to reproduce a content corresponding to C4, it is necessary to re-code the content in accordance with encoding parameters conforming to the processing capability for C1, so as to re-create the content.

Figure 18:
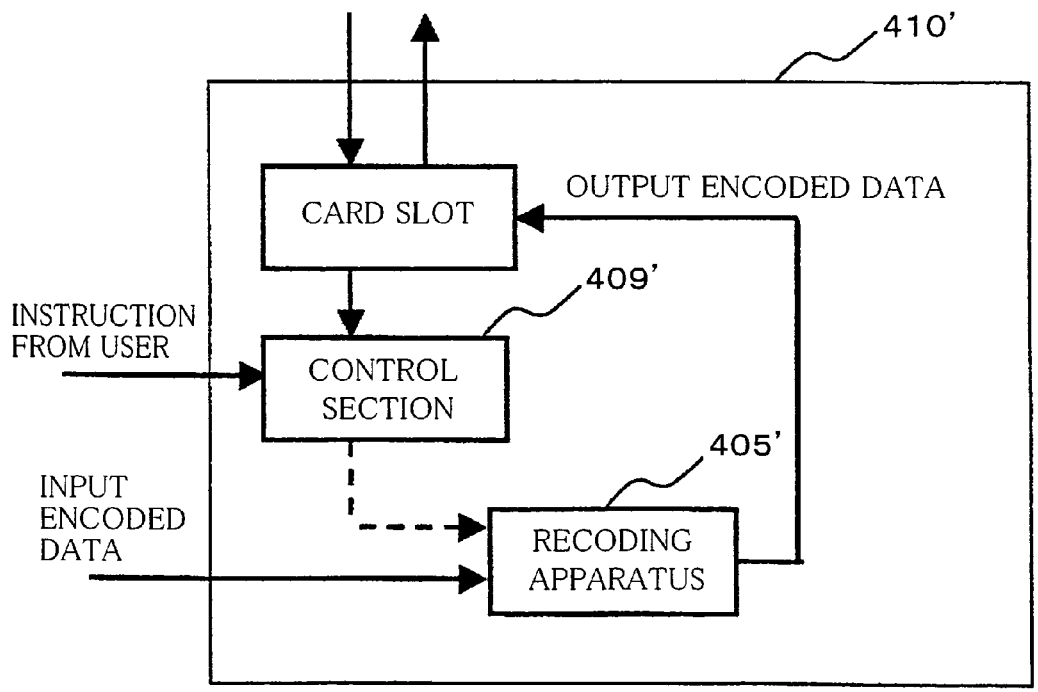
FIG. 18 is a block diagram showing an arrangement of a content recording apparatus in accordance with an embodiment.
Figure 19:
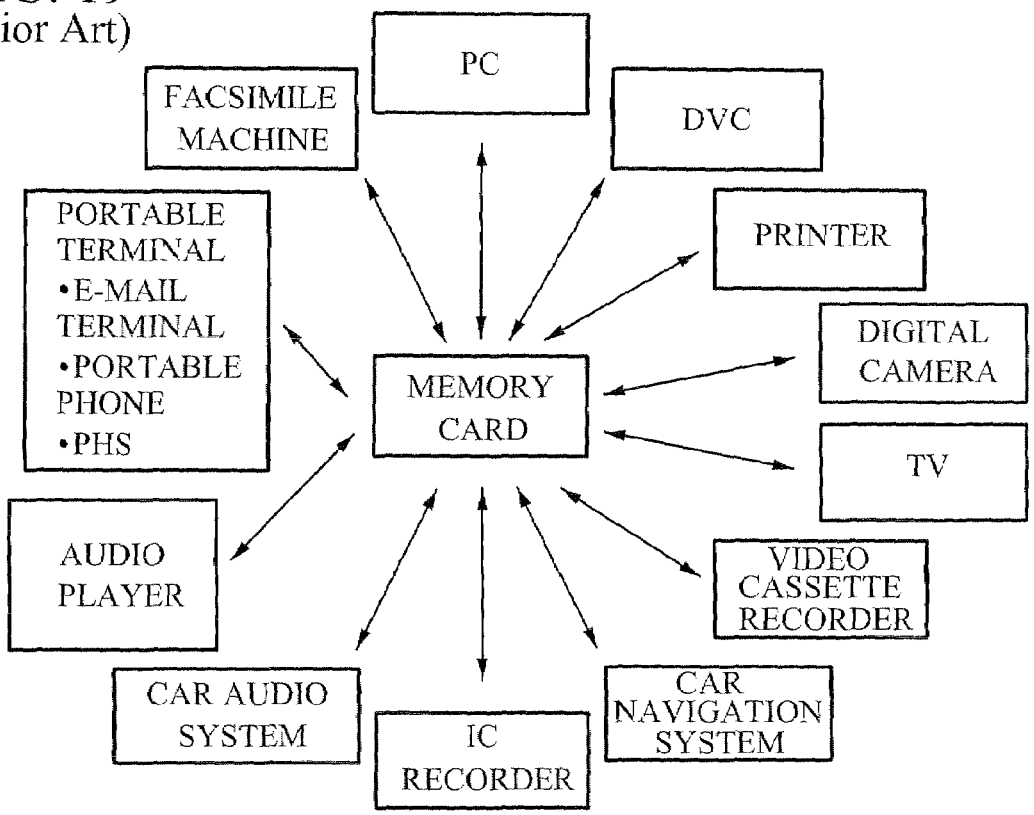
FIG. 19 is a diagram showing an example of devices that use a current memory card in recording and reproducing.
Figure 20:
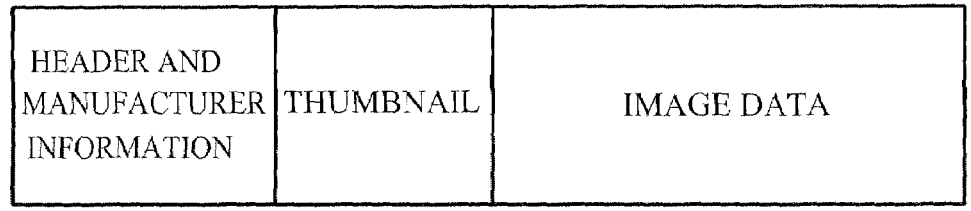
FIGS. 20(a) and 20(b) are diagrams showing conventional formats for recording content.
Figure 20:
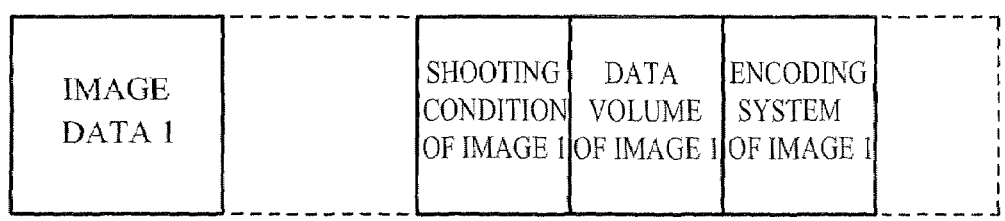

FIG. 18 is a block diagram showing a content recording apparatus 410' of Seventh Embodiment.

The content recording apparatus 410' in accordance with Seventh Embodiment receives and re-codes encoded data (content), and records the re-coded content on the memory card. In this case, the input data has been already encoded by another content recording apparatus (not shown). It is assumed here that the other content recording apparatus (not shown) is a DVC supporting C4 and the content reproducing apparatus is a portable phone supporting C1. It is also assumed here that information of the content reproducing apparatus (portable phone) is recorded to a capability table in the capability information file when the memory card 101 is inserted into the content reproducing apparatus (portable phone) as in Fifth Embodiment. Table 11 shows an example of the capability table here.

TABLE 11

EXAMPLE OF CAPABILITY TABLE

| NAME OF REPRODUCING APPARATUS | | | PORTABLE PHONE |
|---|---|---|---|
| TYPE OF CONTENT | | | MOVING IMAGE, SOUND |
| REPRODUCING CAPABILITY | MOVING IMAGE | ENCODING SYSTEM | MPEG-4 |
| | | BIT RATE | 64 kbps |
| | | SIZE | QCIF |
| | | FRAME RATE | 15 fps |
| | SOUND | ENCODING SYSTEM | G.726 |
| | | SAMPLING FREQUENCY | 8 kHz |
| | | BIT RATE | 16 kbps |

Further, since content files have been already recorded on the memory card, reproducibility information with respect to each of the content files may be recorded in the capability information file. In typical cases, the reproducing apparatus accesses in accordance with the management information pre-recorded on the memory card, only a content recorded in the directory for the reproducing apparatus in question. Here, as an exceptional case, the reproducing apparatus accesses a content in a directory for another terminal, and records in the capability information file in the directory for the other terminal, whether or not the reproducing apparatus in question can reproduce the content in the directory for the other terminal. Table 12 is an example of the reproducibility information that is recorded in the capability information file as described above.

TABLE 12

EXAMPLE OF REPRODUCIBILITY INFORMATION

| STORAGE DIRECTORY AND FILE NAME | JUDGMENT RESULT OF REPRODUCIBILITY |
|---|---|
| DIRECTORY A/CONTENT A1 | 1 |
| DIRECTORY A/CONTENT A2 | 0 |
| DIRECTORY B/CONTENT B1 | 1 |
| DIRECTORY C/CONTENT C1 | 0 |

As shown in Table 12, the reproducibility information records a file name and a judgment result as to whether or not the reproducing apparatus (portable phone) can reproduce a content file under the file name ("0" indicates that the reproducing apparatus cannot reproduce the content file, and "1" indicates that the reproducing apparatus can reproduce the content file). A reproducing apparatus (portable phone) supporting C1, for example, is judged as not capable of reproducing content files C2 through C4. Note that, in Table 12, if a directory (B) corresponds to the reproducing apparatus (portable phone) in question, it is not necessary to create reproducibility information of a content in the directory (B).

The control section 409' shown in FIG. 18 searches for the capability information file in the directories on the memory card in accordance with management information pre-recorded on the memory card. If a capability information file corresponding to a plurality of content reproducing apparatuses is obtained as a result of the searching, the control section 409' displays on a display section (not shown), a list of the reproducing apparatuses, and selects one of the reproducing apparatuses that is designated by instructions from the user. The list is displayed on the display section as in the example shown in FIG. 17 which is cited in Sixth Embodiment. The control section 409' reads out a capability table (see Table 11) from the capability information file on the memory card, and sets encoding parameters of a re-coding apparatus 405' in accordance with the capability table. Here, the encoding parameters are such that the image size is QCIF, the bit rate is 64 kps, and the frame rate is 15 fps.

If the reproducibility information (see Table 12) is recorded in the capability information file, the control section 409' presents on the display section (not shown), a list of contents whose judgment results of reproducibility are "0". Then, the control section 409' reads out encoded data of a content designated by instructions from the user. Alternatively, without displaying the list to the user, the control section 409' reads out encoded data of the contents whose judgment results of reproducibility are "0".

The re-coding apparatus 405' decodes the input encoded data so as to reproduce moving image data; re-codes the reproduced moving image data in accordance with the encoding parameters set by the control section 409'; and records the encoded data (content) on the memory card. Specifically, the reproduced moving image data is re-coded such that the size is reduced from CIF to QCIF, the target bit rate is set to 64 kbps, and the frame rate is 15 fps.

Here, the re-coding apparatus 405' may completely reproduce the encoded data before re-coding the reproduced moving image data, or may re-code the original encoded data only by re-creating a portion of the data other than information such as motion vector which requires high throughput. Further, the example shown in FIG. 18 shows only one type of re-coding apparatus, but the content recording apparatus 410' may include a plurality of re-coding apparatuses respectively for different contents or in different re-coding systems.

The content thus recorded on the memory card can be reproduced by a content reproducing apparatus (portable phone) supporting C1. As described above, the processing capability that can be handled by the content reproducing apparatus is pre-recorded on the memory card. With this, the content is re-coded using encoding parameters which are within the processing capability of the content reproducing apparatus, so that the content (encoded data) that the content reproducing apparatus cannot support can be recorded on the memory card after being converted into a content that the content reproducing apparatus can reproduce.

Note that, the foregoing explained the encoding parameters with respect to the processing capability for contents in the same encoding system. However, some arrangements of the re-coding apparatus 405 allow the encoding system of the content to change from MPEG-4 to MPEG-2. Further, the type of the content is not limited to moving image, and may be sound, audio, or still image.

Note that, the content reproducing apparatus of the present embodiment may be arranged similarly to the content reproducing apparatus 210' shown in FIG. 9. Here, the reproducing capability storing section 207' stores the information of the capability table of Table 11, and the decoding device 205' is an MPEG-4 decoding device.

As described above, the memory card pre-records processing capability information (such as a type of content, an encoding system of content, and processing capability values that allow reproduction) of the content reproducing apparatus, and the content recording apparatus automatically converts the content into a content that meets the processing capability information. With this, even if a content recorded on the memory card is re-coded, it is possible to record on the memory card, a content that can be surely reproduced by each of the content reproducing apparatuses without requiring the user to perform any complicated setting.

The example embodiment being thus described, it will be obvious that the same may be varied in many ways. Such variations are not to be regarded as a departure from the spirit and scope of the example embodiment, and all such modifications as would be obvious to one skilled in the art are intended to be included within the scope of the following claims.

INDUSTRIAL APPLICABILITY

In the example embodiment presented herein, a recording apparatus automatically reads out information pre-written onto a recording medium, the information indicating a type of content, an encoding system of content, a reproducing capability, etc., that can be handled by a reproducing apparatus; and then sets an encoding parameter, etc., in accordance with the read out information. With this, the user does not need to designate a type, an encoding system, an encoding parameter, etc., of content, and the reproducing apparatus can surely reproduce in a normal manner, any content recorded on the recording medium.

Further, since the recording apparatus reads the information stored in the recording medium, the recording apparatus can know the reproducing capability of the reproducing apparatus in advance. With this, by re-coding an existing content (encoded data) using an encoding system and encoding parameter that can be handled by the reproducing apparatus, the recording apparatus can record on the recording medium, a content that can be reproduced by the desired reproducing apparatus.

Further, even if there are a plurality of reproducing apparatuses, multiple pieces of the information respectively corresponding to the reproducing apparatuses may be registered on the recording medium, and an content storage area in the recording medium may be arranged to have a plurality of directories respectively corresponding to the reproducing apparatuses. With this, it is possible to record on the recording medium, a content that can be reproduced by a desired one of the reproducing apparatuses. Further, the user can easily select a reproducing apparatus by selecting from a list of choices of the reproducing apparatuses, for example.

Further, the recording apparatus specifies the reproducing apparatus based on a directory name created on the recording medium, sets an encoding parameter corresponding to the specified reproducing apparatus, and records encoded data in a directory having the directory name. With this, the user does not need to designate the encoding system and encoding parameter of content, etc., and the reproducing apparatus can surely reproduce in a normal manner, any content recorded in the directory on the recording medium.

Further, the recording apparatus specifies the reproducing apparatus based on a content file name created on the recording medium, and sets an encoding parameter corresponding to the specified reproducing apparatus. With this, the user does not need to designate the encoding system and encoding parameter of content, etc., and the reproducing apparatus can surely reproduce in a normal manner, any content recorded on the recording medium.

The invention claimed is:

1. A removable recording medium allowing a content recorded on said removable recording medium to be reproduced when attached to at least one content reproducing apparatus, comprising:
   a first area for pre-storing one or more conditions by said at least one reproducing apparatus when interfaced with said removable recording medium that allows a content to be reproduced by said at least one reproducing apparatus, said one or more conditions being used by at least one content recording apparatus, said one or more conditions defining at least one processing parameter of the reproducing apparatus;
   a second area for storing one or more contents created in accordance with said one or more conditions by said at least one content recording apparatus, wherein
   the removable recording medium is shared among said at least one content recording apparatus and said at least one reproducing apparatus, wherein
   said at least one content reproducing apparatus pre-stores on said removable recording medium in said first area, at least one capability information file regarding at least one of said content reproducing apparatus's capabilities of said at least one content reproducing apparatus, wherein said at least one capability information file includes said one or more conditions;
   said removable recording medium when interfaced with said at least one content recording apparatus allows access by a file management program of said at least one content recording apparatus to at least one capability information file pre-stored on said removable recording medium; wherein
   said removable recording medium allows access by a selecting program for selecting said at least one capability information file pre-stored on said removable recording medium;
   if only one capability information file exists, the selecting program selects said one capability information file by default;
   said removable recording medium providing to said at least one content recording apparatus said selected capability information file;
   said at least one content recording apparatus analyzes said selected capability information file provided by said removable recording medium, and stores on said removable recording medium only contents that conform to the limitations of said one or more conditions of said selected capability information file.

2. The removable recording medium as set forth in claim 1, wherein:
   a plurality of said capability information files are stored in said first area; and
   a plurality of said contents respectively corresponding to the plurality of said capability information files are recorded in said second area.

3. The removable recording medium as set forth in claim 2, further comprising:
   an area for recording information indicating which one of said plurality of capability information file a recording apparatus should refer to.

4. The removable recording medium as set forth in claim 3, wherein:
   said information indicates one of said plurality of capability information files that is most recently stored in said removable recording medium.

5. The removable recording medium as set forth in claim 1, wherein
   said one or more conditions define a processing capability of a decoder of the reproducing apparatus, and said one or more conditions including at least a type of a content to be reproduced.

6. The removable recording medium as set forth in claim 1, wherein
   said one or more conditions define a processing capability of a decoder of the reproducing apparatus, and said one or more conditions including at least an encoding system of the content to be reproduced.

7. A content recording apparatus encoding a content and recording the content on a removable recording medium being shared among said content recording apparatus and at least one content reproducing apparatus, comprising:
   file management programmed logic circuitry for, in accordance with management information pre-recorded on said removable recording medium, allowing access to at least one capability information file pre-stored on said removable recording medium;
   capability information selecting programmed logic circuitry for selecting said at least one capability information file pre-stored on said removable recording medium containing at least one of reproducing conditions; wherein
   if only one capability information file exists, the selecting program selects said one capability information file by default;
   capability information reading out programmed logic circuitry for reading out from the selected capability information file, capability information regarding a content reproducing capability of said at least one content reproducing apparatus that recorded the selected capability information file, wherein said capability information file contains said at least one reproducing condition that defines at least one processing parameter of the content reproducing apparatus;
   said content recording apparatus analyzes said selected capability information file recorded on said removable recording medium;
   said content recording apparatus using parameter setting programmed logic circuitry for setting at least one processing parameter to be used by said content recording apparatus in recording the content, wherein
   said content recording apparatus creating only a content that does not exceed the content reproducing capability of said content reproducing apparatus, where
   the content is created in accordance to the selected capability information file.

8. The content recording apparatus as set forth in claim 7, further comprising:
   programmed logic circuitry for re-coding in accordance with said at least one capability information file, a received content into an encoded content reproducible by the at least one content reproducing apparatus, if the received content has been already encoded.

9. The content recording apparatus as set forth in claim 7, further comprising:
   reading out programmed logic circuitry for reading out before said content recording apparatus records the content, a directory name created on said removable recording medium; and
   setting programmed logic circuitry for setting in accordance with the read out directory name, a reproducing condition of the content, wherein said reproducing condition defines a processing parameter of the content reproducing apparatus.

10. The content recording apparatus as set forth in claim 7, further comprising:

reading out programmed logic circuitry for reading out before said content recording apparatus records the content, a content file name recorded on said removable recording medium; and setting programmed logic circuitry for setting in accordance with the read out file name, a reproducing condition of the content, wherein said reproducing condition defines a processing parameter of the content reproducing apparatus.

11. The content recording apparatus as set forth in claim 7, wherein said content recording apparatus downloads a content via a communications network and records the content on said removable recording medium, comprising:

reading out programmed logic circuitry for reading out from said removable recording medium before said content recording apparatus downloads the content, a pre-stored capability information file that allows the content to be reproduced, wherein said pre-stored capability information file defines at least one processing parameter of the content reproducing apparatus; and programmed logic circuitry for setting in accordance with said capability information file, a capability of downloading the content.

12. The content recording apparatus as set forth in claim 7, wherein:

said file management programmed logic circuitry records on said recording medium in accordance with the management information pre-recorded on said removable recording medium, the content created by said content recording apparatus so as to be associated with the one of the at least one capability information file that is selected by said capability information selecting programmed logic circuitry.

13. The content recording apparatus as set forth in claim 7, wherein:

said capability information selecting programmed logic circuitry reads out content reproducing apparatus types respectively from the at least one capability information file that are searched for by said file management programmed logic circuitry, and selects the one of the at least one capability information file so as to correspond to the content reproducing apparatus that is specified.

14. A content reproducing apparatus reading out a content recorded on a removable recording medium being shared among said content reproducing apparatus and at least one content recording apparatus and reproducing the content after applying predetermined signal processing to the content, comprising:

programmed logic circuitry for storing on said removable recording medium at least one condition that allows a future recorded content recorded in said removable recording medium to be reproduced by said content reproducing apparatus;

wherein said at least one condition defines at least one processing parameter of the reproducing apparatus; and programmed logic circuitry for reading contents from the removable recording medium when the removable recording medium is reinserted, wherein the content reproducing apparatus uses the content reproducing apparatus's decoder for the reproducing of the content.

15. The content reproducing apparatus as set forth in claim 14, wherein:

said content reproducing apparatus records on said removable recording medium when storing said reproducing condition in said recording medium, information indicating whether or not said reproducing condition is a condition that a content recording apparatus should refer to.

16. A content recording/reproducing system, including at least one content recording apparatus for recording a content on a removable recording medium shared between said at least one recording apparatus and at least one content reproducing apparatus for reproducing the content recorded on the removable recording medium, wherein:

said content reproducing apparatus records on said removable recording medium, at least one capability information file regarding a content reproducing capability of said content reproducing apparatus, wherein said at least one capability information file define at least one processing parameter of the at least one content reproducing apparatus;

said at least one content recording apparatus comprising:

file management programmed logic circuitry for, in accordance with management information pre-recorded on said removable recording medium, searching for at least one capability information file pre-stored on said removable recording medium;

capability information selecting programmed logic circuitry for selecting one of the at least one capability information file;

capability information reading out programmed logic circuitry for reading out from the selected one of the at least one capability information file, capability information regarding a content reproducing capability of said content reproducing apparatus that recorded the selected one of the at least one capability information file, wherein said capability information files define at least one processing parameter of the content reproducing apparatus; and said content recording apparatus analyzes the capability information file recorded on said removable recording medium;

parameter setting programmed logic circuitry for setting a processing parameter to be used by said content recording apparatus in recording the content, said content recording apparatus creating only a content that does not exceed the content reproducing capability of said content reproducing apparatus, where the content is created in accordance to the selected one of the at least one capability information file and records on said recording medium, only a content that does not exceed the content reproducing capability of said content reproducing apparatus.

* * * * *

UNITED STATES PATENT AND TRADEMARK OFFICE
CERTIFICATE OF CORRECTION

PATENT NO. : 7,594,041 B2
APPLICATION NO. : 10/495101
DATED : September 22, 2009
INVENTOR(S) : Aono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1385 days.

Signed and Sealed this

Twenty-eighth Day of September, 2010

David J. Kappos
*Director of the United States Patent and Trademark Office*